US009626334B2

(12) United States Patent
Kaul et al.

(10) Patent No.: US 9,626,334 B2
(45) Date of Patent: Apr. 18, 2017

(54) SYSTEMS, APPARATUSES, AND METHODS FOR K NEAREST NEIGHBOR SEARCH

(71) Applicant: Intel Corporation, Santa Clara, CA (US)

(72) Inventors: Himanshu Kaul, Portland, OR (US); Mark A. Anders, Hillsboro, OR (US); Sanu K. Mathew, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 99 days.

(21) Appl. No.: 14/582,607

(22) Filed: Dec. 24, 2014

(65) Prior Publication Data

US 2016/0188533 A1 Jun. 30, 2016

(51) Int. Cl.
*G06K 9/62* (2006.01)
*G06F 15/80* (2006.01)
*G06F 7/00* (2006.01)
*G06F 17/30* (2006.01)

(52) U.S. Cl.
CPC ........... *G06F 15/8092* (2013.01); *G06F 7/00* (2013.01); *G06F 17/3033* (2013.01)

(58) Field of Classification Search
CPC .................... G06F 15/8092; G06F 15/80
USPC ....................................... 382/224
See application file for complete search history.

(56) References Cited

U.S. PATENT DOCUMENTS 5,740,326 A * 4/1998 Boulet .................. G06F 7/544
  382/158
2015/0242463 A1* 8/2015 Lin .................... G06F 17/3069
  707/769

OTHER PUBLICATIONS

D.G. Lowe, "Distinctive image features from scale-invariant keypoints," Int. J. Comput. Vis., vol. 60, No. 2, pp. 91-110, 2004.
G. Kim, et al., "An 86 mW 98GOPS ANN-Searching Processor for Full-HD 30 fps Video Object Recognition with Zeroless Locality-Sensitive Hashing," IEEE Journal of Solid State Circuits, vol. 48, pp. 1615-1624, Jul. 2013.
H. Bay, et al., "Surf: Speeded up robust features," European Conference on Computer vision, pp. 404-417, 2006.

* cited by examiner

*Primary Examiner* — Ruiping Li
(74) *Attorney, Agent, or Firm* — Nicholson De Vos Webster & Elliott, LLP

(57) ABSTRACT

Systems, apparatuses, and methods for k-nearest neighbor (KNN) searches are described. In particular, embodiments of a KNN accelerator and its uses are described. In some embodiments, the KNN accelerator includes a plurality of vector partial distance computation circuits each to calculate a partial sum, a minimum sort network to sort partial sums from the plurality of vector partial distance computation circuits to find k nearest neighbor matches and a global control circuit to control aspects of operations of the plurality of vector partial distance computation circuits.

17 Claims, 24 Drawing Sheets

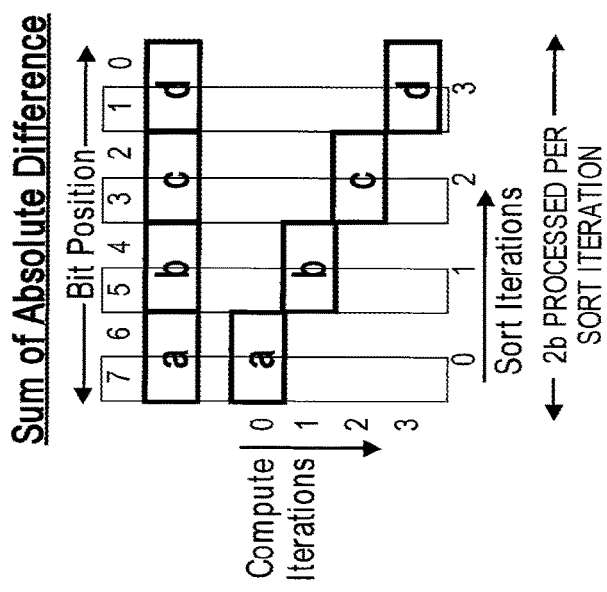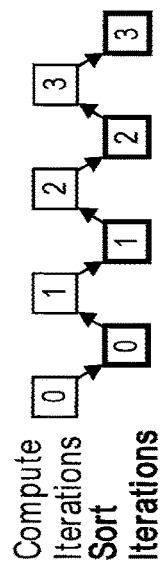
FIG. 6

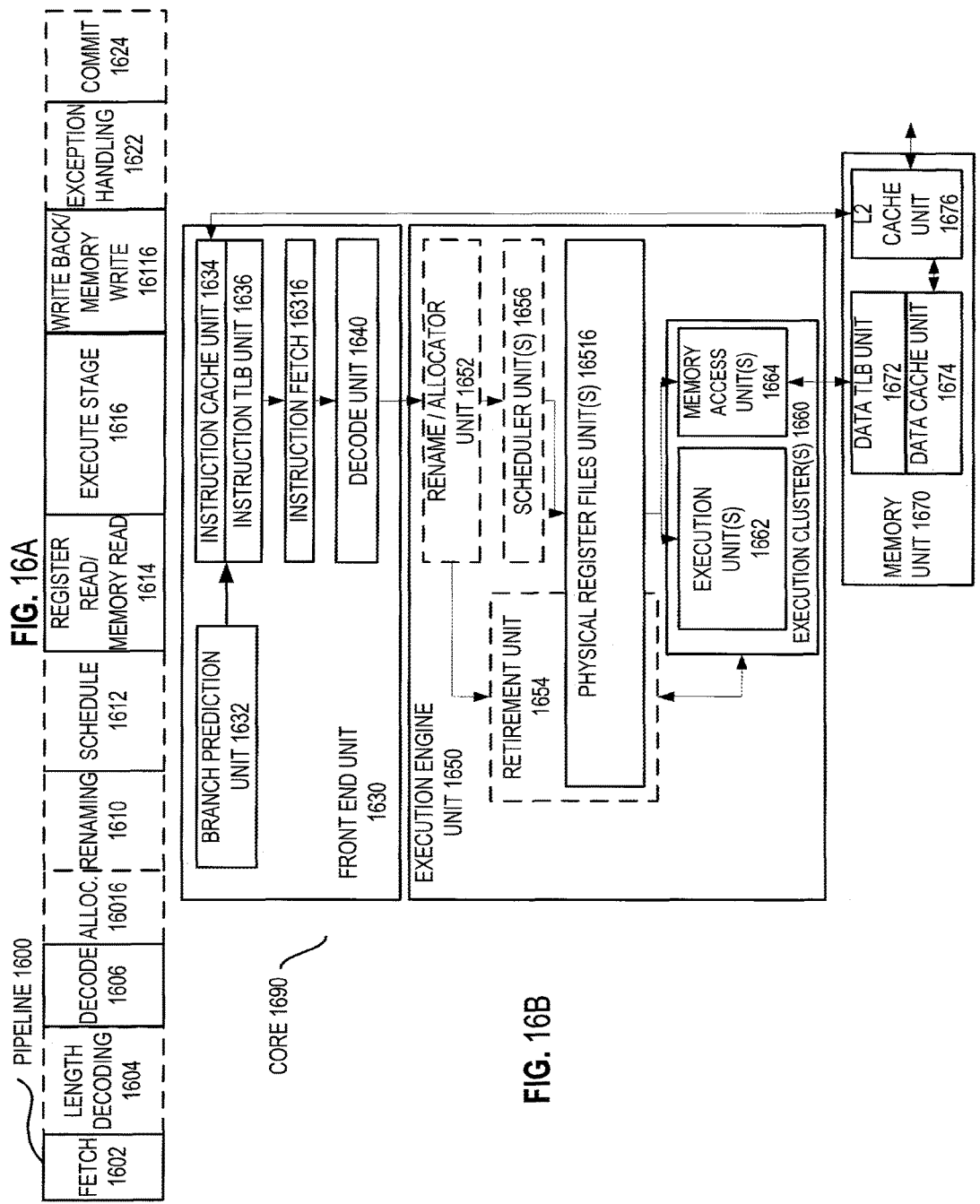

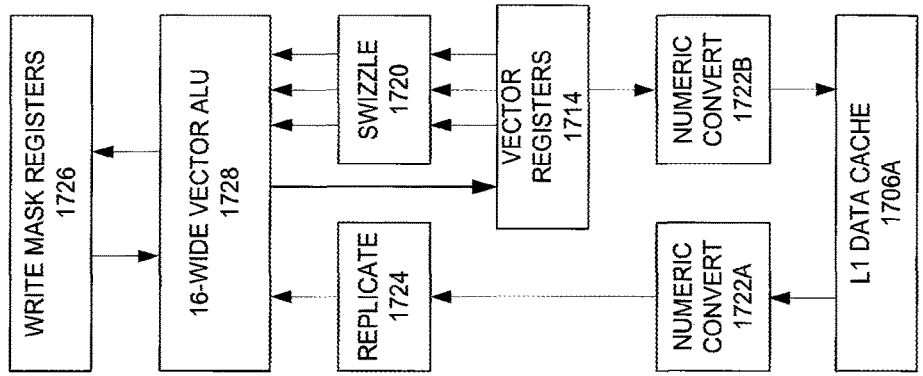
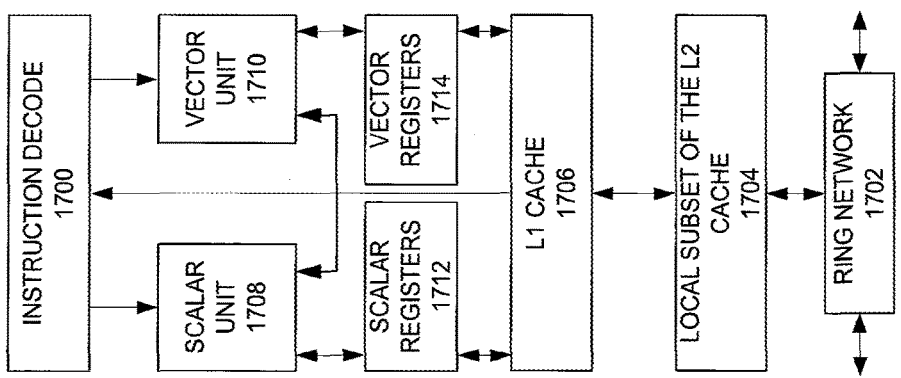

SYSTEMS, APPARATUSES, AND METHODS FOR K NEAREST NEIGHBOR SEARCH

This invention was made with Government support under contract number H98230-11-3-0011 awarded by the Department of Defense. The Government has certain rights in this invention.

FIELD OF INVENTION

The field of invention relates generally to computer processor architecture, and, more specifically, nearest neighbor search.

BACKGROUND

There are many applications where a fast and efficient nearest neighbor search for multidimensional features (points) of a data set are desirable. For example, this type of search is beneficial in the areas such as image reconstruction and machine learning. There are several ways of nearest neighbor data set searching. In nearest neighbor searching, given a set of points in a space and an input instance (query point), a search is done to find a closest point in a set to the input instance.

BRIEF DESCRIPTION OF THE DRAWINGS

The present invention is illustrated by way of example and not limitation in the figures of the accompanying drawings, in which like references indicate similar elements and in which:

FIG. 6 illustrates an exemplary Euclidian distance sort processing according to an embodiment.

FIG. 16A is a block diagram illustrating both an exemplary in-order pipeline and an exemplary register renaming, out-of-order issue/execution pipeline according to embodiments of the invention.

FIG. 16B is a block diagram illustrating both an exemplary embodiment of an in-order architecture core and an exemplary register renaming, out-of-order issue/execution architecture core to be included in a processor according to embodiments of the invention.

FIGS. 17A-B illustrate a block diagram of a more specific exemplary in-order core architecture, which core would be one of several logic blocks (including other cores of the same type and/or different types) in a chip.

DETAILED DESCRIPTION

Figure 1:
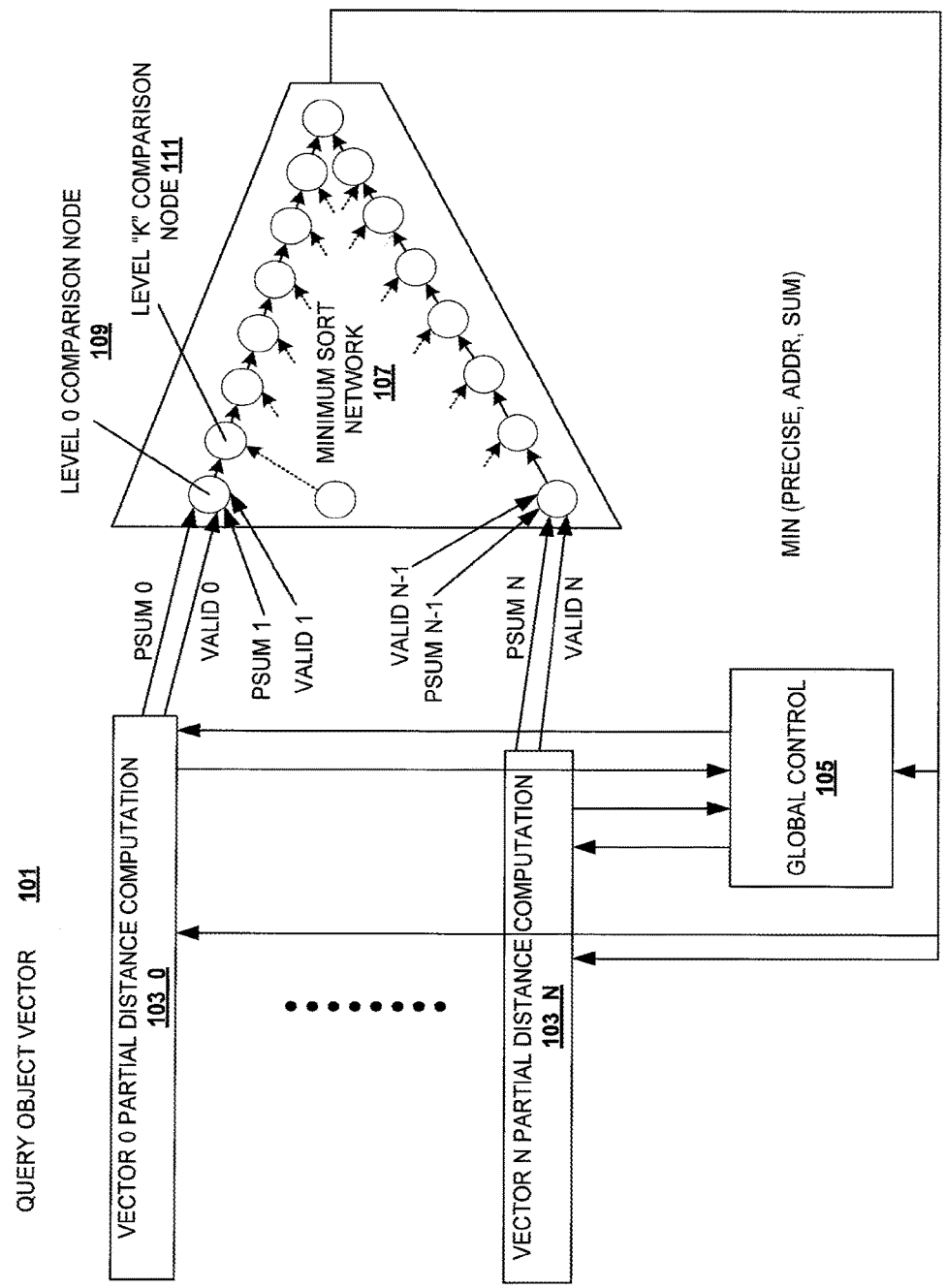
FIG. 1 shows a high-level kNN accelerator organization according to an embodiment.

In the following description, numerous specific details are set forth. However, it is understood that embodiments of the invention may be practiced without these specific details. In other instances, well-known circuits, structures and techniques have not been shown in detail in order not to obscure the understanding of this description.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

An approach to nearest neighbor searching is to compute a distance from the input instance to every point in a data set and keeping track of the shortest distance. However, this simplistic approach may not be workable for larger data sets. The distance calculation may be done using a k-dimensional (k-d) tree to perform an exhaustive examination of all features one feature at a time. This approach is therefore slow and additionally has high power consumption.

Another nearest neighbor approach uses Voronoi diagrams. Each Voronoi diagram partitions a plane into regions of equal nearest neighbors called cells. This is illustrated by a plurality of cells that each have one feature (point). In theory, a "best-matched" feature may be found for any input instance using a Voronoi diagram to locate the feature in a particular cell. However, as shown, Voronoi cells are highly irregularly shaped and are difficult to compute (they are both time and processor intensive) and use. In other words, Voronoi diagrams do not lend themselves to easy, or efficient, nearest neighbor feature searches.

Detailed herein are embodiments of systems, apparatuses, and methods to be used in improved nearest neighbor searching that overcomes the shortcomings of the above approaches. In short, given an input (i.e., an observation) a search for the best-matched feature in a feature space (i.e., a dictionary of features) is made. This approach is especially well suited to feature vectors that are typically sparsely presented in a high-dimensional vector space (note that features in this description are vectors and, thus, feature and feature vector are used interchangeably).

Detailed below are embodiments of a k-nearest neighbor (kNN) accelerator that adjusts the accuracy of the distance computations to minimize the level required to find each nearest neighbor. Many candidate vectors are eliminated from the search space using only low accuracy computations, while remaining candidates closer to the nearest neighbor are eliminated at later iterations using higher accuracy to declare a winner. Since the majority of the computations require lower accuracy and consume lower energy, overall kNN energy efficiency is significantly improved. Typically, this kNN accelerator is a part of a central processing unit (CPU), graphics processing unit (GPU), etc. However, the kNN accelerator may be external to the CPU, GPU, etc.

FIG. 1 shows a high-level kNN accelerator according to an embodiment. In this accelerator, there are a few main components include a plurality of vector partial distance computation circuits 103_0 to 103_N, a global control circuit 105, and a minimum sort network 107. Each of these components will be discussed in detail below.

A query object vector 101 is input into the plurality of vector partial distance computation circuits 103_0 to 103_N for partial distance computation. Not shown is storage for this object vector which is present. The partial distance computation circuits 103_0 to 103_N compute partial distances for each reference vector and an accumulated distance, and provide a valid indication to the minimum sort network 107. Using multi-iteration partial distance calculation between a query (101) and stored vectors with lower significance bit accuracy improving in each iteration as detailed herein is more energy efficient than past approaches. Partial distance computation involves computing fewer bits of the complete distance starting from the MSB in each iteration for different distance metrics (such as Euclidian (sum of squares) distance and Manhattan (sum of absolute difference) distance). The partial result is added to the accumulated completed distance at the right significance, resulting in increasing accuracy of lower significance bits as the computations proceed.

Figure 2:
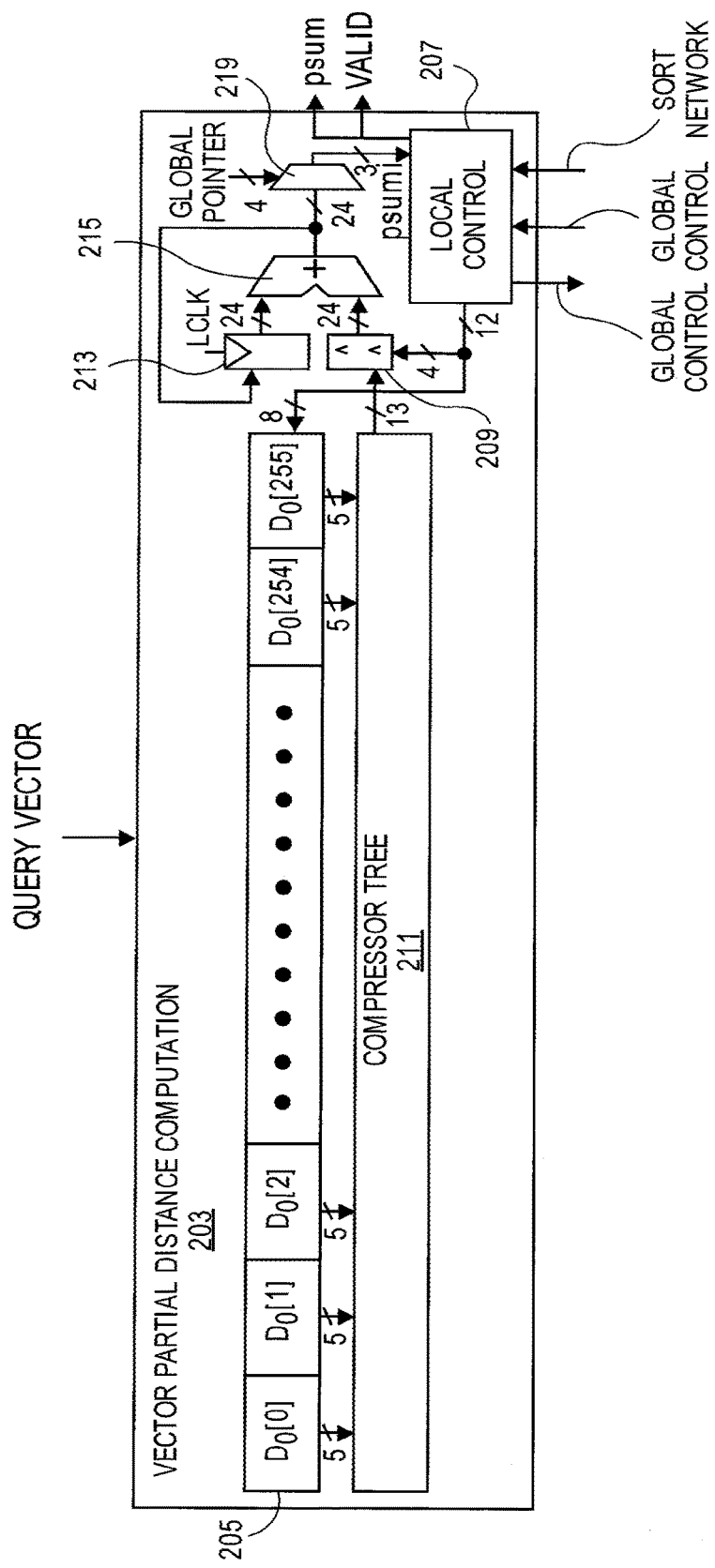
FIG. 2 illustrates an exemplary vector partial distance computation circuit according to an embodiment.

FIG. 2 illustrates an exemplary vector partial distance computation circuit 203 according to an embodiment. The vector is composed of many dimensions, with each dimension represented by 8b in this example. Individual distances in each dimension are first computed by 205 and they are then added to find the overall distance in 211. A local control circuit 207 provides an indication of which bits to select in the different data element calculator circuits 205.

Figure 3:
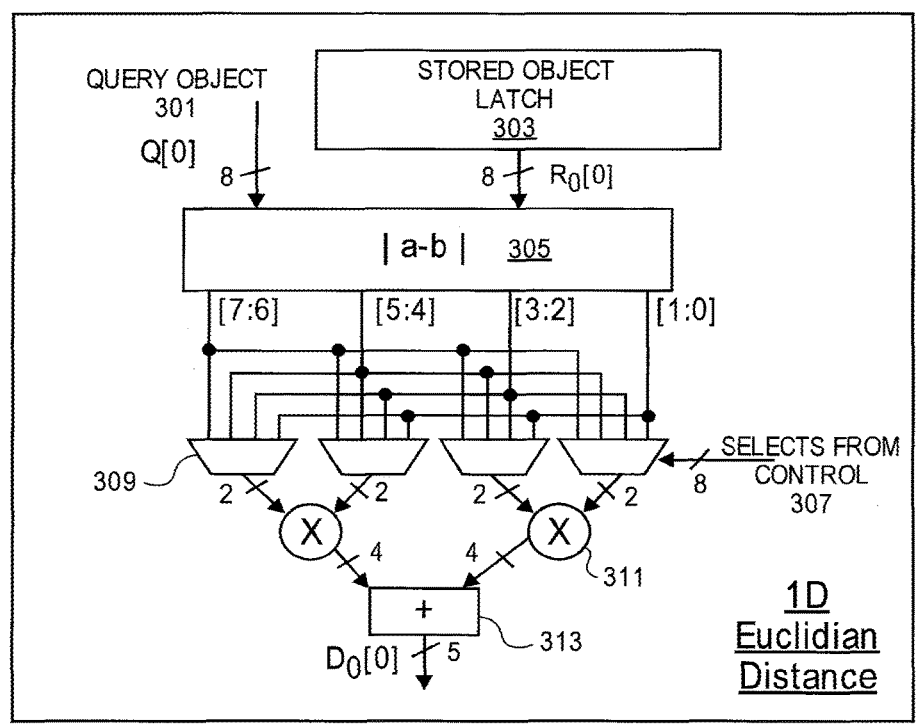
FIG. 3 illustrates an exemplary vector partial distance sum of absolute difference data element calculation circuit according to an embodiment.

As noted above, there may be a few different types of distances metrics used and therefore different data element calculator circuits 205. When a sum of absolute difference (Manhattan distance) metric is used, a selection of the appropriate two bits (2b) from the absolute difference of each vector element and summing them up is done in vector partial distance computation circuit 203. FIG. 3 illustrates an exemplary vector partial distance sum of squared differences (Euclidian distance) element calculator circuit 205 according to an embodiment. As shown, a portion of a query object (as shown 8 bits) and a portion of a stored object (same number of bits) have an absolute differences (|a−b|) calculation made by hardware and particular bits of that result are selected using multiplexers and a control signal. In some embodiments, a local control circuit provides the control signal as will be detailed below. The results of the muxing are multiplied (a pair of 2b×2b partial multiplies) and then added to generate a sum of absolute differences (SAD) calculation. In this example, the output is a 5-bit SAD value which represents a partial distances when computing the square of the differences. These are added by compressor tree 211 to compute a partial Euclidian distance for the entire vector.

Figure 4:
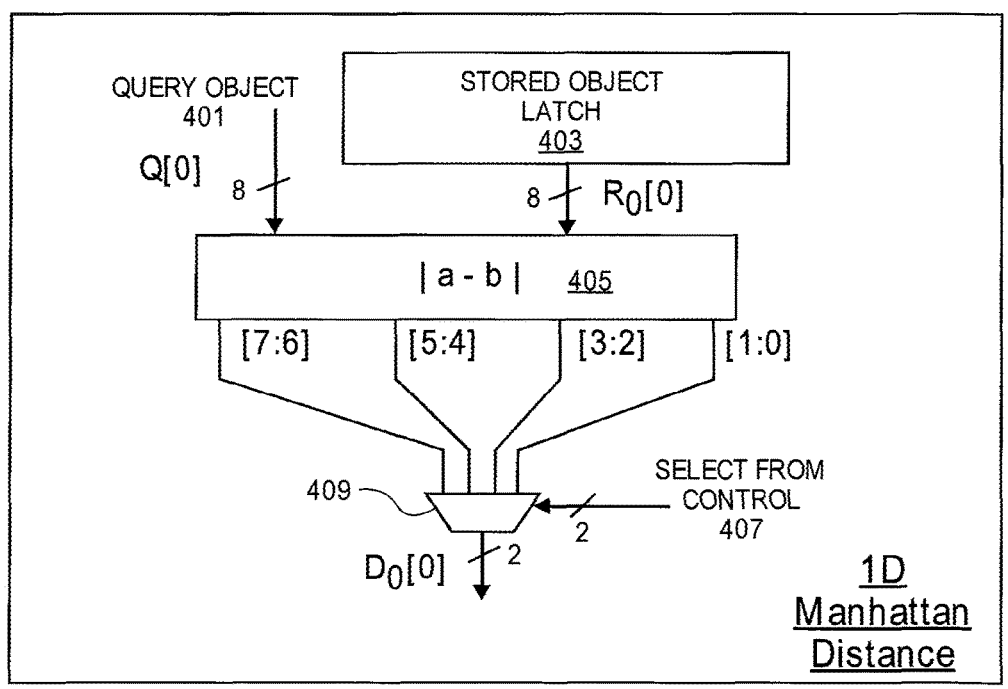
FIG. 4 illustrates an exemplary vector partial distance sum of squares data element calculation circuit according to an embodiment.

When a sum of absolute difference (Manhattan distance) metric is used, a selection of the appropriate two bits (2b) from the absolute difference of each vector element and summing them up is done in vector partial distance computation circuit 203. FIG. 4 illustrates an exemplary vector partial distance sum of absolute differences data element calculator circuit 205 according to an embodiment. As shown, a portion of a query object (as shown 8 bits) and a portion of a stored object (same number of bits) have an absolute differences (|a−b|) calculation made by hardware and particular bits of that result are selected using a multiplexer and a control signal. In some embodiments, a local control circuit provides the control signal as will be detailed below. In this example, the output is a 2-bit value.

The partial SAD computation reduces compresses tree size by a factor of four times, while the partial Euclidian metric computation replaces 8-bit×8-bit multiplier per vector element with a couple of trivial 2-bit multipliers and also reduces the compressor tree 211 area by a factor of three times. This non-obvious construction of the Euclidian distance ensures that after processing a higher MSB position, any subsequent lower MSB refinement does not affect any upper order bits by more than 1 as discussed with respect to FIGS. 3, 4, 6, and 7.

In some embodiments, due to a common hardware datapath, a single circuit is used to reconfigure between different metrics.

A compressor tree 211 adds the outputs of each of the data element distance calculators. In a 256-bit dimension vector, this output is a 13-bit value. The output of the compressor tree 211 is sent to a shifter 209. Typically, this shifter is a right shifter, however, depending upon the endian configuration it may be a left shifter. The shift amount is controlled by local control circuit 207 in most embodiments. The sifter aligns the partial distance at the right significance with respect to the accumulated distance.

Flip-flop 213 stores the accumulated distance from a previous iteration while the output of the adder 215 is the accumulated distance in the current iteration. At the start of the next iteration this value is written into flip-flop 213. The selector 219 selects the 2b from the accumulated distance based on the global pointer. It also selects the carry-out at that 2b position from adding the partial sum to the previous accumulated distance.

Figure 5:
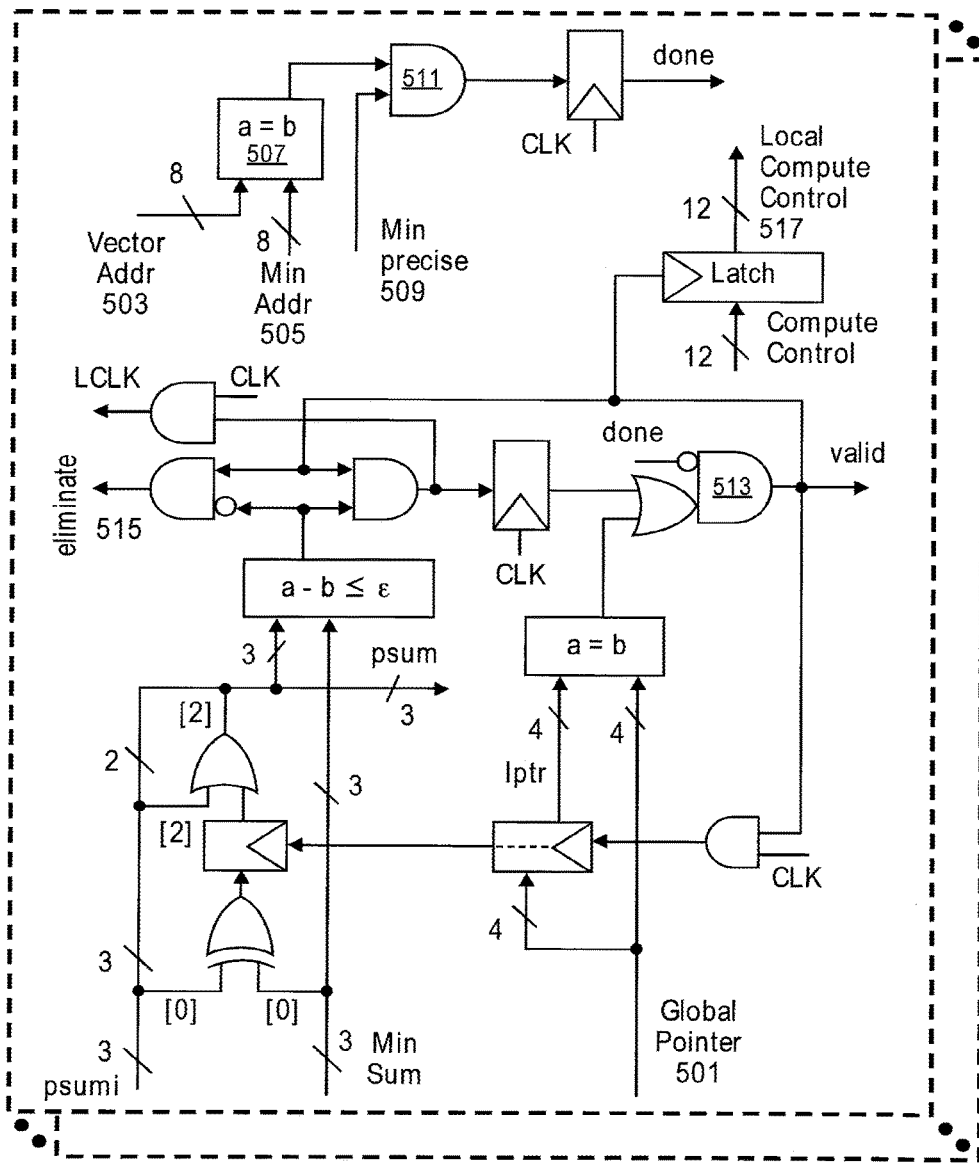
FIG. 5 illustrates an exemplary local control circuit according to an embodiment.

The local control circuit 207 takes in psumi as an input and only modifies the upper bit before passing it on to the sort network 107 as a psum value (e.g., 3 bits). A valid bit is also passed to the minimum sort network 107. FIG. 5 illustrates an exemplary local control circuit according to an embodiment. The local control circuit controls several different aspects of the vector partial distance computation circuit as detailed above. This circuit receives a global pointer (detailed below) from a global control unit, along with a psum from the selector 213, and a minimum sum, address, and precise indicator from the minimum sort network 107.

As shown, the local control circuit takes an address of the vector being processed and a minimum address from the minimum sort network 107 and uses comparison circuitry to determine if they are equal. The output from that comparison is logically ANDed with the minimum precision from the minimum sort network 107 to help determine if the vector object being should no longer be processed. In particular, this output is used in the calculation of a valid bit such as through the AND gate shown. The local control circuit uses the minimum sum, psumi, and global pointer to generate an eliminate signal, and local compute signal (used to control the different data element calculator circuits 205) as shown. Vector processing can be stopped for one of 2 reasons–1) the current vector is declared a winner or 2) the current vector is removed from the search space when it is guaranteed not to be the nearest neighbor. The description in above is for the former, asserting the 'done' signal. The inversion of this signal (shown going through a bubble into the AND gate 513) affects the valid signal. If the 'done' is asserted the valid signal will de-assert. The remaining logic to affect valid determines if the vector is not done but is still part of the search space. The eliminate signal indicates that vector is removed from search space in the current iteration and this information is used by the global control. The circuit show in FIG. 5 also creates clocks from the global CLK signal to control the clocking of storage elements (including 213). The local control circuit also receives "Compute Control" from the global control circuit, which it then passes onto the partial distance compute 205 and shifter circuit 209.

In essence, the local control circuit provides a local state control per vector with global state control across all vectors to keep track of distance computation states and iterations at which they are eliminated enabling reuse of prior distance computations and comparisons when computing a sorted list for k>1.

Figure 7:
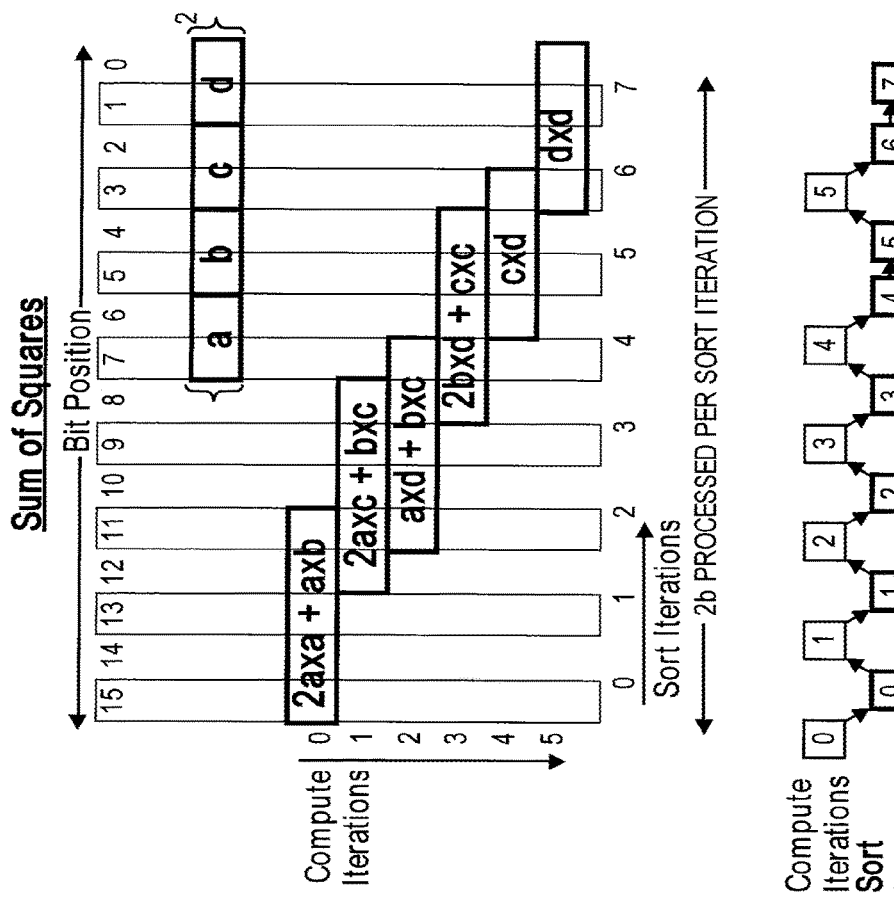
FIG. 7 illustrates an exemplary data element Manhattan distance sort processing according to an embodiment.

Partial distance computation and sort iterations are interleaved as shown in FIGS. 6 and 7. FIG. 6 illustrates an exemplary Euclidian distance sort processing according to an embodiment and FIG. 7 illustrates an exemplary data element Manhattan distance sort processing according to an embodiment. In these illustrations the letters (a, b, c, and d) are elements. As shown, the typical process is to do a compute iteration by vector partial distance computation circuits 103_0 to 103_N followed by a sort in the minimum sort network 107. However, there are times when a delay is required such as that shown in FIG. 7.

The minimum sort network 107 performs window based sorting. In particular, this sort network processes a much smaller window of bits starting from most significant bit (MSB) of a partially computed distance to enable much smaller comparator circuits and early elimination of vector candidates for further partial computation For example, in some embodiments the sort network processes a window of only 2 bits of the accumulated vector distances from MSB to LSB in each iteration (FIGS. 6 and 7). This enables a high parallelization with very low hardware complexity. Since the computation refinements at lower bits can affect already processed bits in the MSB by a maximum of 1, the sort network 107 also needs to process the carry-out generated from the compute iteration at the current 2b window. As a result the sort network 107 compares, for example, 3b numbers (carry-out and 2b sum) at each node 109 and 111. In comparison, for a 256-dimension vector distance comparison (8b per element) a conventional sort network would require 24b comparators at each node.

The sort network 107 globally broadcasts the minimum 3b result found and local control for individual vector distance computations compare their 3b (carryout and 2b sum) to this broadcast result to see if the particular vector can be eliminated from further distance refinement computations and comparisons using the global 105 and local control circuits.

Due to the property that lower order computations could affect a current processed window by 1 in a future iteration, all 3b compares in the local control and sort network 107 require a difference of more than 1 for a candidate to be eliminated. For the same reason, the local control also takes into account if a particular vector was greater by 1 from the minimum in a previous iteration. Using precise signals, the sort network 107 indicates whether the minimum found is unique. Sorting iterations continue until a unique nearest vector is found or the LSB is reached. Feedback from the sort network eliminates candidate vectors from further distance computation and comparisons, resulting in up to 3× computation reduction.

Figure 8:
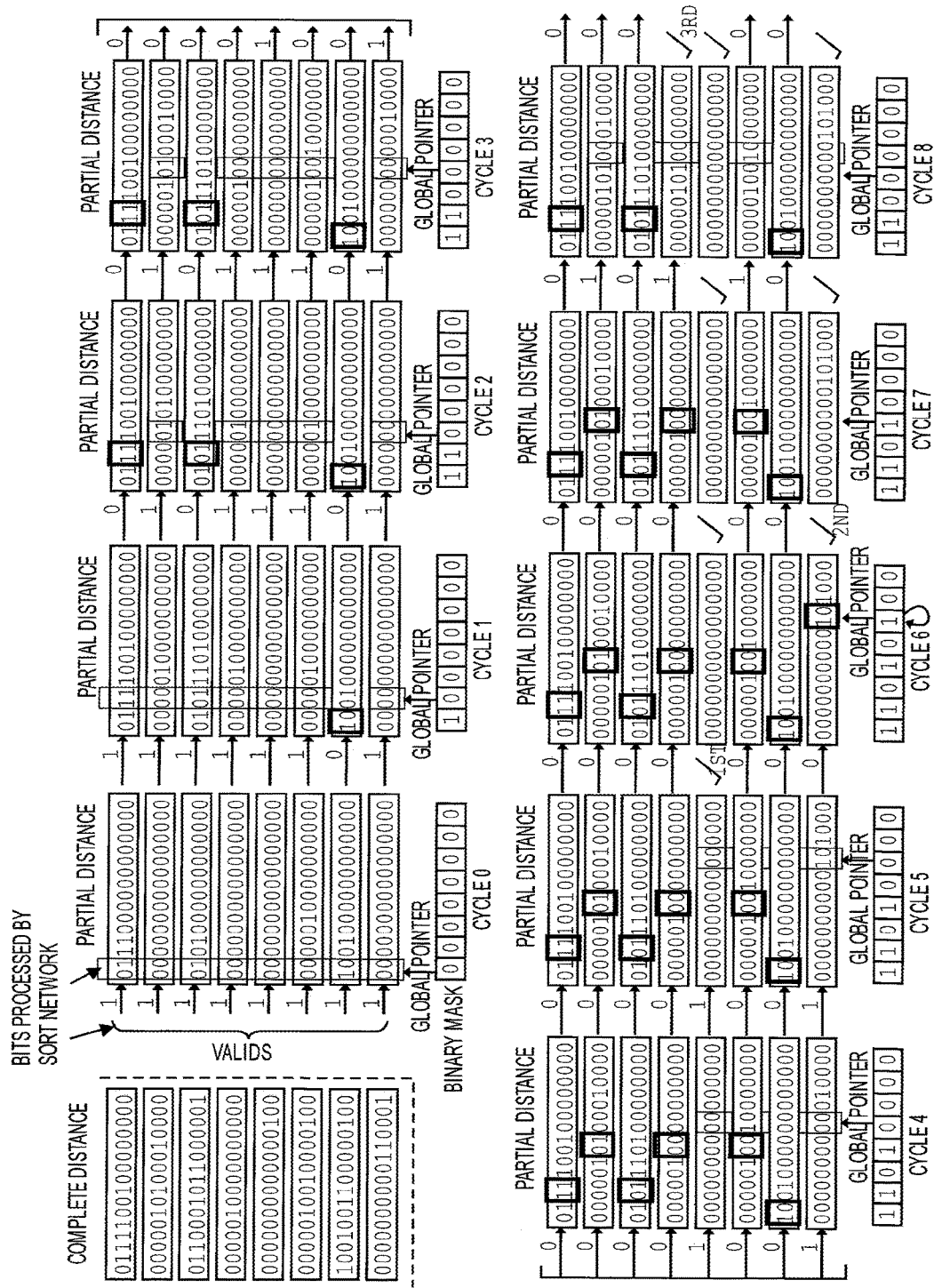
FIG. 8 illustrates an exemplary sort operation using partial distances according to an embodiment.

FIG. 8 illustrates an exemplary sort operation using partial distances according to an embodiment. As vector candidates are eliminated while finding the best candidate, their local state control stores the iteration at which they are eliminated (shown as lptr signal in FIG. 5) and with boxes in FIG. 8).

Simultaneously, as the global control pointer moves forward (towards the LSB), if even a single vector is dropped a 1 is written into the associated bit position of a global binary mask (which is stored in global control circuit 105). After the first vector is found, the global binary mask indicates to the global control logic 105 where the global pointer needs to jump back to for the group of vectors that would contain the next nearest neighbor(s). This process continues iteratively and is illustrated for the second and third nearest neighbor search in FIG. 8. When a global pointer has jumped back towards the MSB, only those vectors whose stored iteration state matches the global pointer position become active. Vectors that are closer to the nearest neighbor will be eliminated at a closer global pointer position. This technique of maintaining states has three advantages over a conventional sorting technique that would simply eliminate the nearest neighbor and start the entire compute and sort process from the beginning—(a) it reuses partial distance computations already performed while finding the previous sort rank, (b) it reduces the number of vectors that need to be compared by leveraging already computed comparisons, and (c) does not require k to be predefined to minimize computations and comparisons for any sorted rank. Computation and comparison reuse advantages with this control quantify the incremental cost of finding the next nearest neighbor out of X (e.g., 256) vectors (e.g., 256 8-b elements per vector) after 3 nearest neighbors have already been found. A conventional sort technique would have resulted in finding the nearest vector from the remaining 253 candidate vectors.

In the illustration, a 2-bit window of partial distance from the vectors is processed. The arrows that point right are valid bits from local control circuitry. In cycle 0, the seventh comparison is off by more than 1 from the minimum and thus this vector can be eliminated. This elimination is stored in the local control circuitry. This process proceeds as detailed above. If all the partial sum computations are processed for all the vectors, the resulting distance would match the complete distances, which are shown on the far left for reference only.

Figure 9:
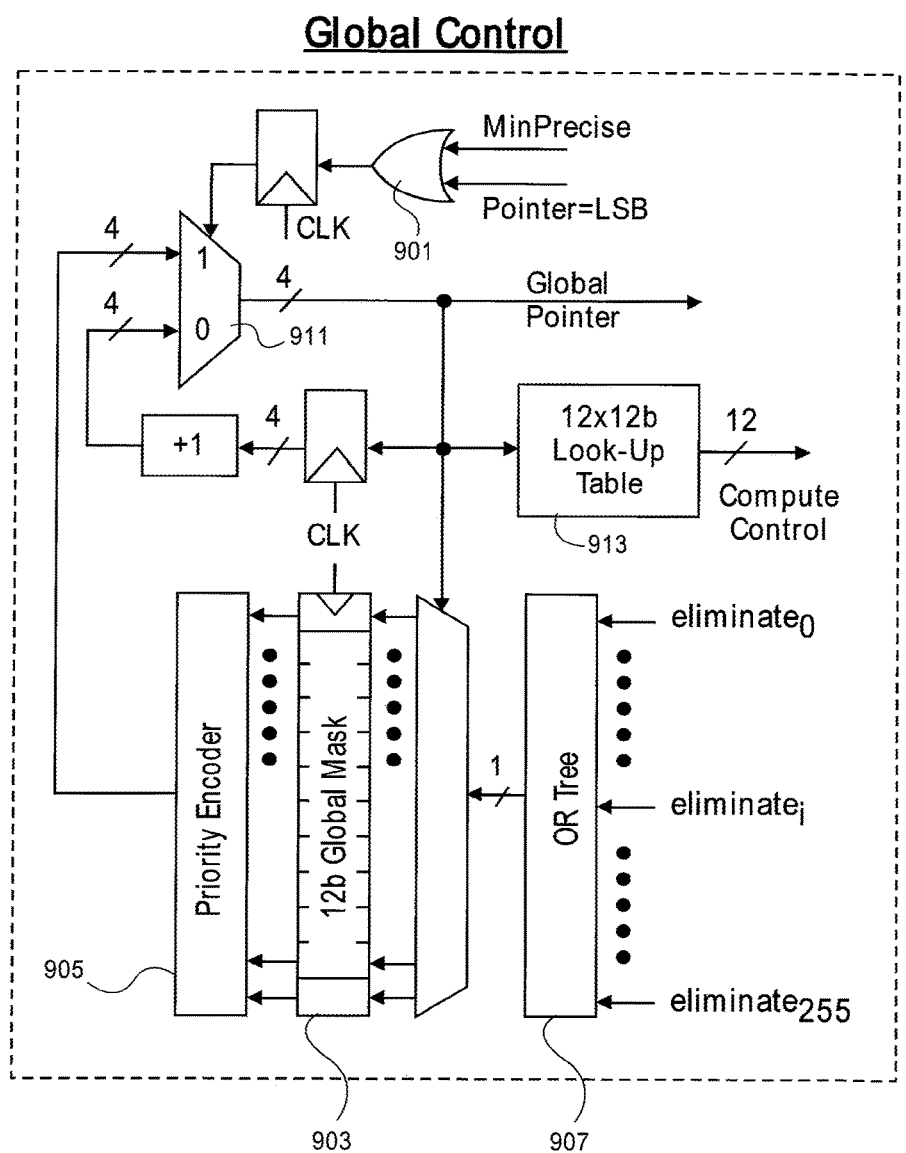
FIG. 9 illustrates an exemplary global control circuit according to an embodiment.

FIG. 9 illustrates an exemplary global control circuit according to an embodiment. As shown in FIG. 1, the global control circuit 105 receives minimum precise, address, and sum values from the minimum sort network 107. The minimum precise signal along with a LSB (pointer) are logically ORd and used as a selection signal for a global pointer output (which is either a previous global pointer or one that has been (priority) encoded from a global binary mask as shown. The global binary mask is made from OR treeing of eliminated signals received from the local control circuitry 207. Compute control signals are found using a lookup table with the global pointer acting as an index to that table. Until a unique minimum or LSB isn't found, the global pointer keeps moving towards LSB every iteration (the pointer is incremented by 1 for this). This condition is tested by the OR gate 901. Otherwise, the pointer rolls back to the nearest 1 in the binary mask to find the next nearest neighbor. Even if one vector is eliminated, a 1 is written into the pointer position inside the binary mask, else a 0 is written. The OR tree 907 detects if even one vector is eliminated (the eliminate signals are generated by all the individual local control circuits), the following de-mux uses the global pointer to set the input of the appropriate position to 1 and this is written into the global binary mask (held in storage 903) when the next iteration starts (rising edge of CLK). The position of the nearest 1 is computed by the priority encoder 905. The compute control broadcast to all the vectors is based on the pointer position. This can be made programmable by storing them in a look up table 913, with the appropriate control signals read based on the pointer.

Figure 10:
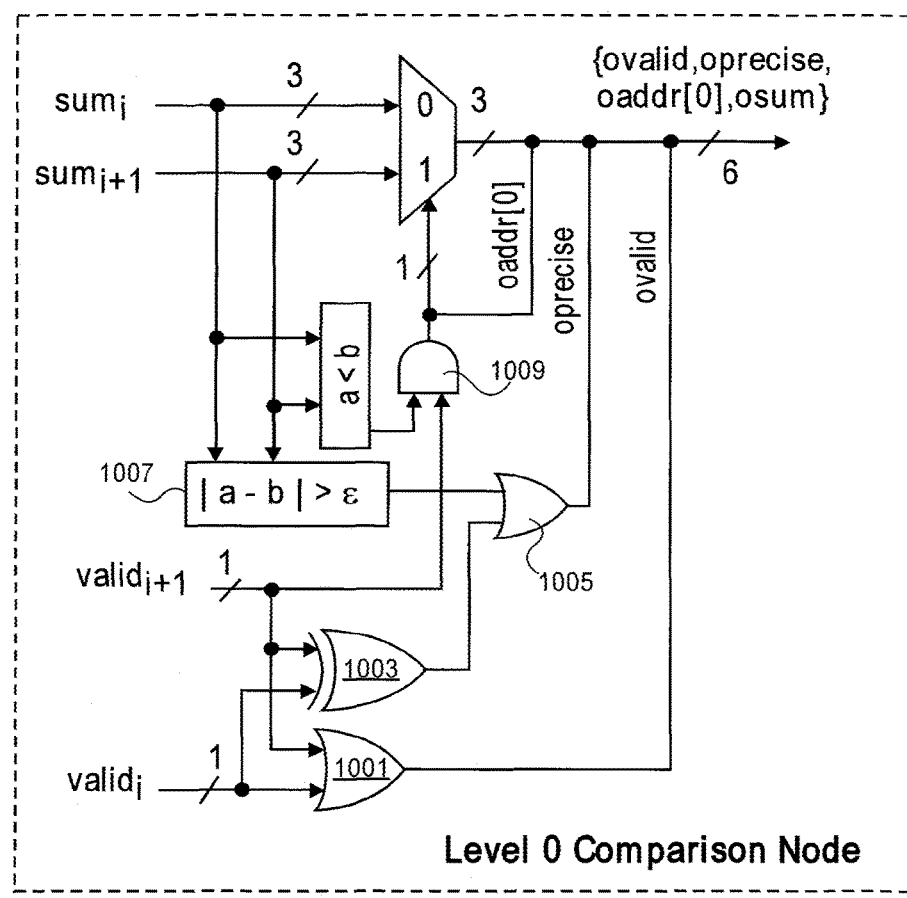
FIG. 10 illustrates an exemplary level 0 comparison node circuit according to an embodiment.

Looking at the minimum sort network 107 in more detail, there are two types of comparison nodes—level 0 and level "k" nodes. FIG. 10 illustrates an exemplary level 0 comparison node circuit according to an embodiment. As shown, the circuit takes in valid bits which are used to indicate if the psum is coming from a vector that is part of the search space. If the valid accompanying a psum is 0, that psum is ignored in a comparison at a node.

The neighboring valid bits are logically ORd to provide a level 0 valid bit. These valid bits are also XORd then ORd with an output of a sum of possible differences of the neighboring sums comparison to generate a precise bit. A precise bit if "1" means that no other vector is close. Finally, the neighboring sums are also compared to each other with the result ANDd with one of the valid bits to form an address and selector for which sum is to be output. The overall output of the level 0 comparison node is an address, valid bit, precise bit, and a sum. The output valid indicates if the result is valid (at least one of the input valids have to be true to meet this condition). The result of the comparison is added to the highest order bit of the address of the minimum vector found (bit [0] in this case since it is the first comparison level). The output precise signal indicates that the 2 vectors are not equivalent or close (difference is greater than 1 if $\epsilon$ is 1 or difference is greater than 0 if $\epsilon$ is 0). The XOR 1003 asserts the precise signal if only one of the inputs is valid irrespective of the compare result (since the comparison does not matter if one of the sums is not valid). The comparison result passes on the smaller sum along with its input address to the next node.

Figure 11:
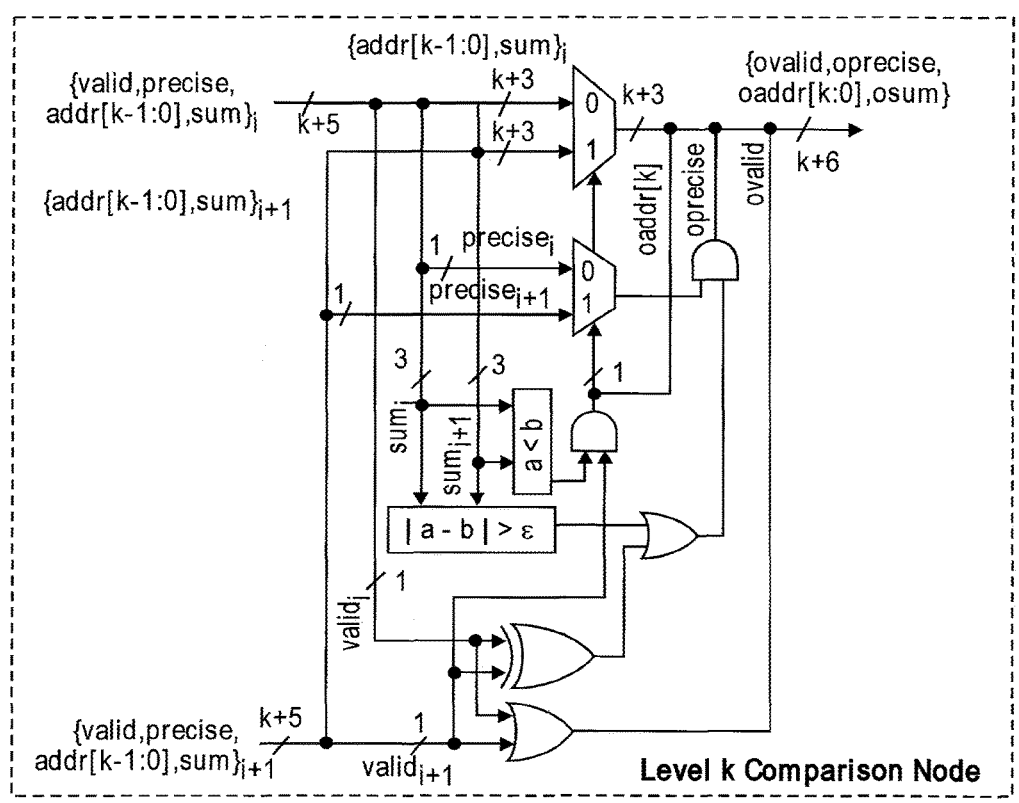
FIG. 11 illustrates an exemplary level k comparison node circuit according to an embodiment.

FIG. 11 illustrates an exemplary level k comparison node circuit according to an embodiment. This circuit takes in neighboring outputs of address, valid bit, precise bit, and a sum from the level that precedes it (e.g., level 0) and subjects them to the circuitry illustrated. The operation is similar to that shown in FIG. 10. The result of the comparison of the sum signals now also selects from incoming precise signals and ANDs the selected precise with the precise signal computed at this node to produce the output precise signal. The output precise signal indicates if the output sum is unique, i.e., smallest by a margin more than $\epsilon$ from any nearest vector across all the vectors starting from level 0.

Figure 12:
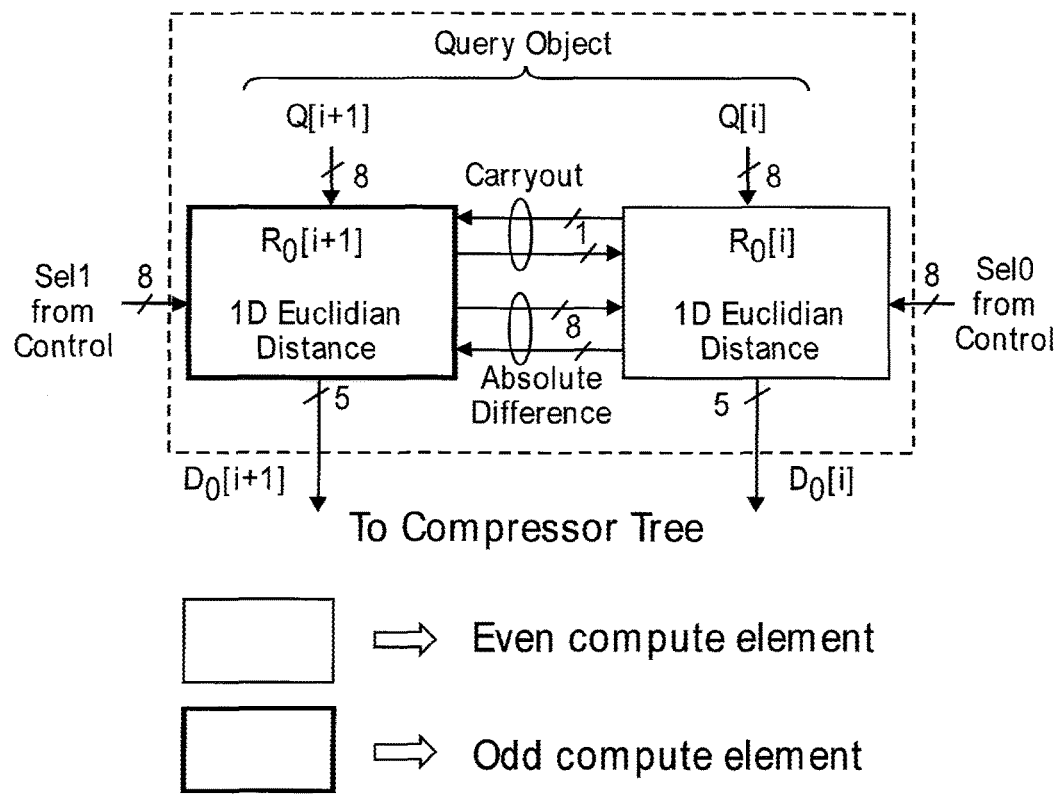
FIG. 12 illustrates an exemplary 8-bit/16-bit reconfigurable computation circuit according to an embodiment.
Figure 13:
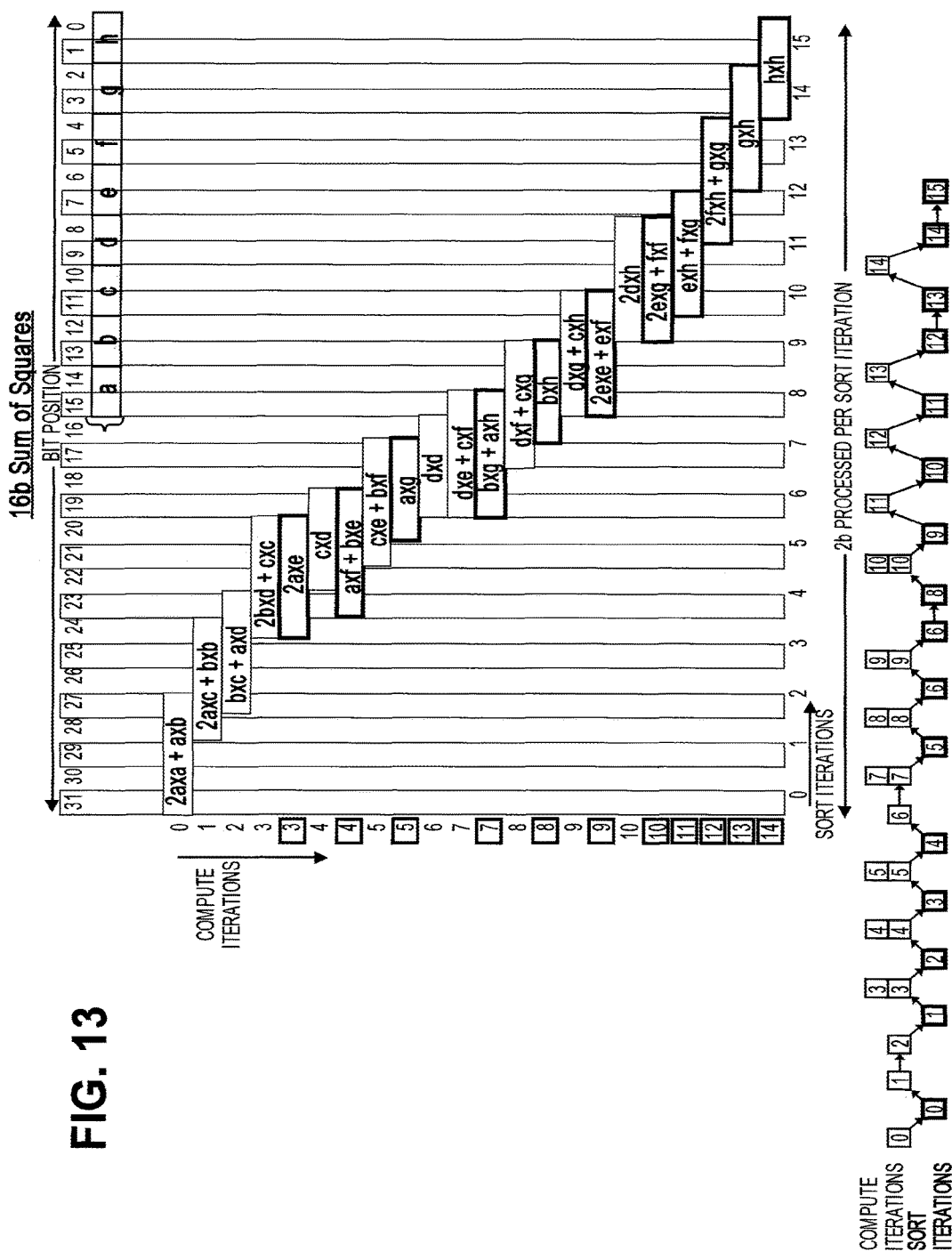
FIG. 13 illustrates exemplary partial distance computations for sum of squares with 16-bit elements according to an embodiment.

Different embodiments of the above described for the kNN accelerator increase flexibility and/or the application space where the accelerator would be beneficial. For example, in some embodiments to enable computations on vector elements larger than 8b, the distance computation circuits designed for 8b elements can be reused for 16b elements by combining pairs of adjacent 8b element circuits. FIG. 12 illustrates an exemplary 8-bit/16-bit reconfigurable computation circuit according to an embodiment. In this circuit, a control signal broadcasts two sets of select signals for even/odd numbered 8b computation circuits. For a fixed circuit and storage size, the vector dimension or number of stored vectors is reduced in half when operating in 16b mode. The number of iterations required to compute a complete sum of squares in 16b mode increases from 6 (for 8b elements) to 15. Multiple compute iterations may be required between successive sort iterations to ensure that upper order bits are not affected by more than 1 when processing lower order bits. Even in 16b mode, accelerator sorting based on partial computations considerably reduces computations for finding the nearest neighbor. FIG. 13 illustrates exemplary partial distance computations for sum of squares with 16-bit elements according to an embodiment. In some embodiments, only 16b widths or reconfigurations are used. Of course, other bit widths or reconfigurations may be used.

In some embodiments, the kNN accelerator is reconfigurable to support larger vector dimensions with an extra stage in the compressor tree of the distance compute unit to add results from other distance compute unit blocks. Consequently, the number of stored vectors reduces as the dimension of each vector is increased.

In some embodiments, the functionality of the kNN accelerator is extended to enable operation on datasets larger than the accelerator storage capacity. Sorted k-nearest candidates from a database stored within the accelerator are first computed, eliminated candidates are replaced by any remaining object descriptors from memory, and the process continues till all object candidates have been iterated through to find the overall k-nearest descriptor vectors. For an accelerator with 256 object capacity and a 256-dimension (8b per dimension) vector for each object feature description, across an object database size from 512 to 2048 objects the accelerator consistently enables a reduction in sum of squares computations for a sorted 16-nearest candidate list.

In some embodiments, in addition to finding vectors by minimum distance, the accelerator can be reconfigured to find vectors in descending order of distance by inverting the output of the 3b comparator circuit inside the compare nodes of the sort network. Alternately, the descending sort order is computed by subtracting the accumulated partial distances from the largest possible distance and then using the same window-based minimum sort network to process the resulting numbers.

In some embodiments, various distance metrics are accommodated by reconfiguring only the 1D distance circuit in the network. Besides Euclidian and Manhattan distances, another popular metric for finding the nearest match to a vector is cosine similarity, which uses the angular distance between vectors to find the nearest match. The cosine of the angle between two vectors A and B is computed as $[\Sigma(a_i \cdot b_i)]/[(\Sigma a_i^2)^{1/2} \cdot (\Sigma b_i^2)^{1/2}]$, with a smaller angle resulting in a larger cosine. For cosine-based similarity, normalization is not required if the stored database is already normalized and the optimization is then transformed into finding the vector that results in the dot product $\Sigma(a_i \cdot b_i)$ with the largest magnitude. The dot product between query and stored objects can be partially computed using the existing 2b multipliers used for the Euclidian metric.

Figure 14:
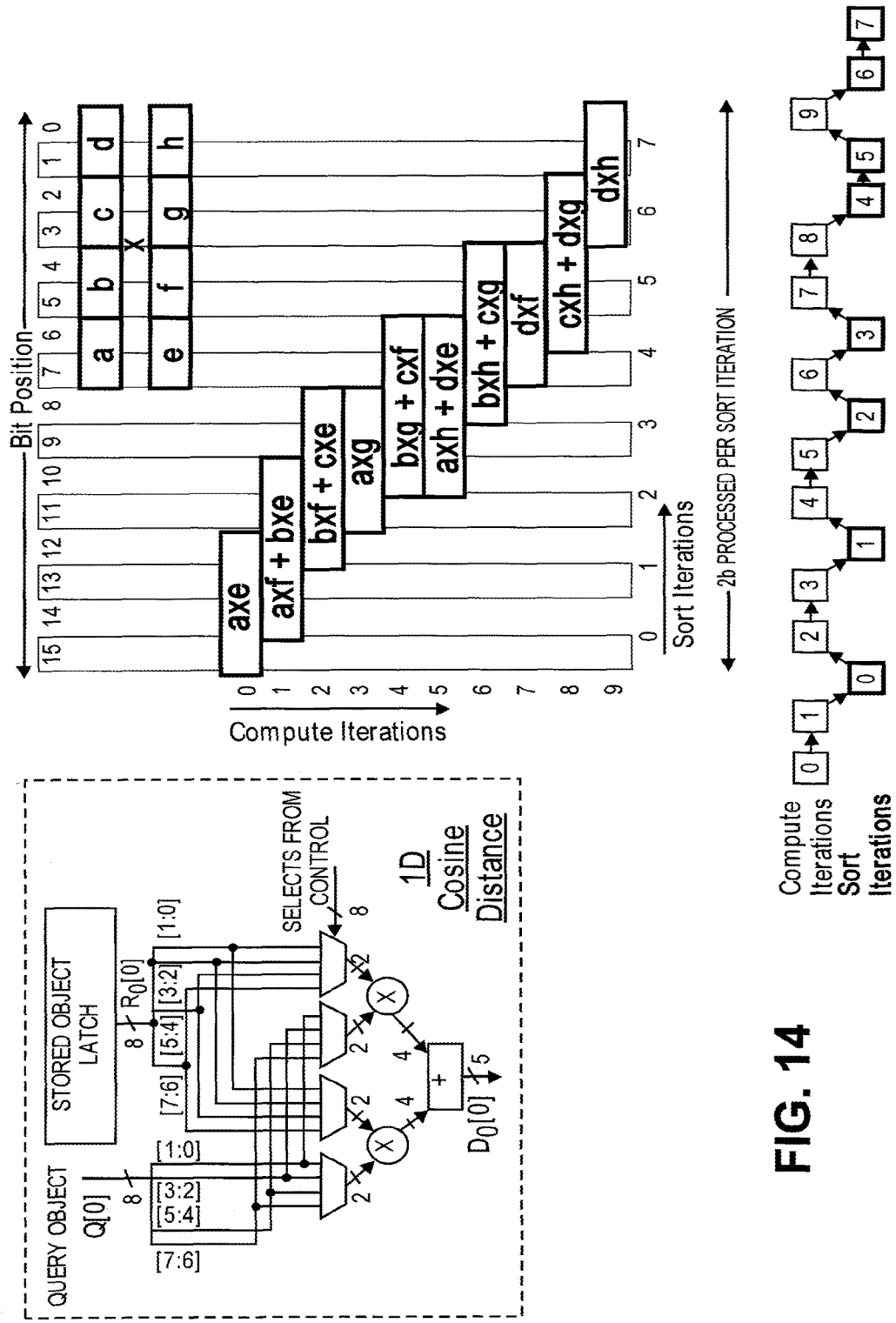
FIG. 14 illustrates a cosine similarity computation (1d distance) circuit according to an embodiment and exemplary partial distance computations for dot products according to an embodiment.

FIG. 14 illustrates a cosine similarity computation (1d distance) circuit according to an embodiment and exemplary partial distance computations for dot products according to an embodiment. Multiple compute iterations may be required between successive sort iterations to ensure that upper order bits are not affected by more than 1 when processing lower order bits. For dot products with signed elements, each compute iteration requires 2 steps—first sum all positive products to the accumulated partial distance and then subtract the sum of all negative products from the accumulated partial distance.

In some embodiments, as iterations proceed, candidate vectors can also be eliminated earlier based on comparison of the accumulated partial distance to a predetermined absolute threshold. Additionally, declaration of a winning vector does not need to be exact and iterations to pick a winner can be stopped earlier based on either a predetermined relative accuracy (using global pointer position) or absolute accumulated partial distance. Such a scheme would reduce energy consumption for algorithms optimized for approximate nearest neighbor (ANN) searches.

Figure 15A:
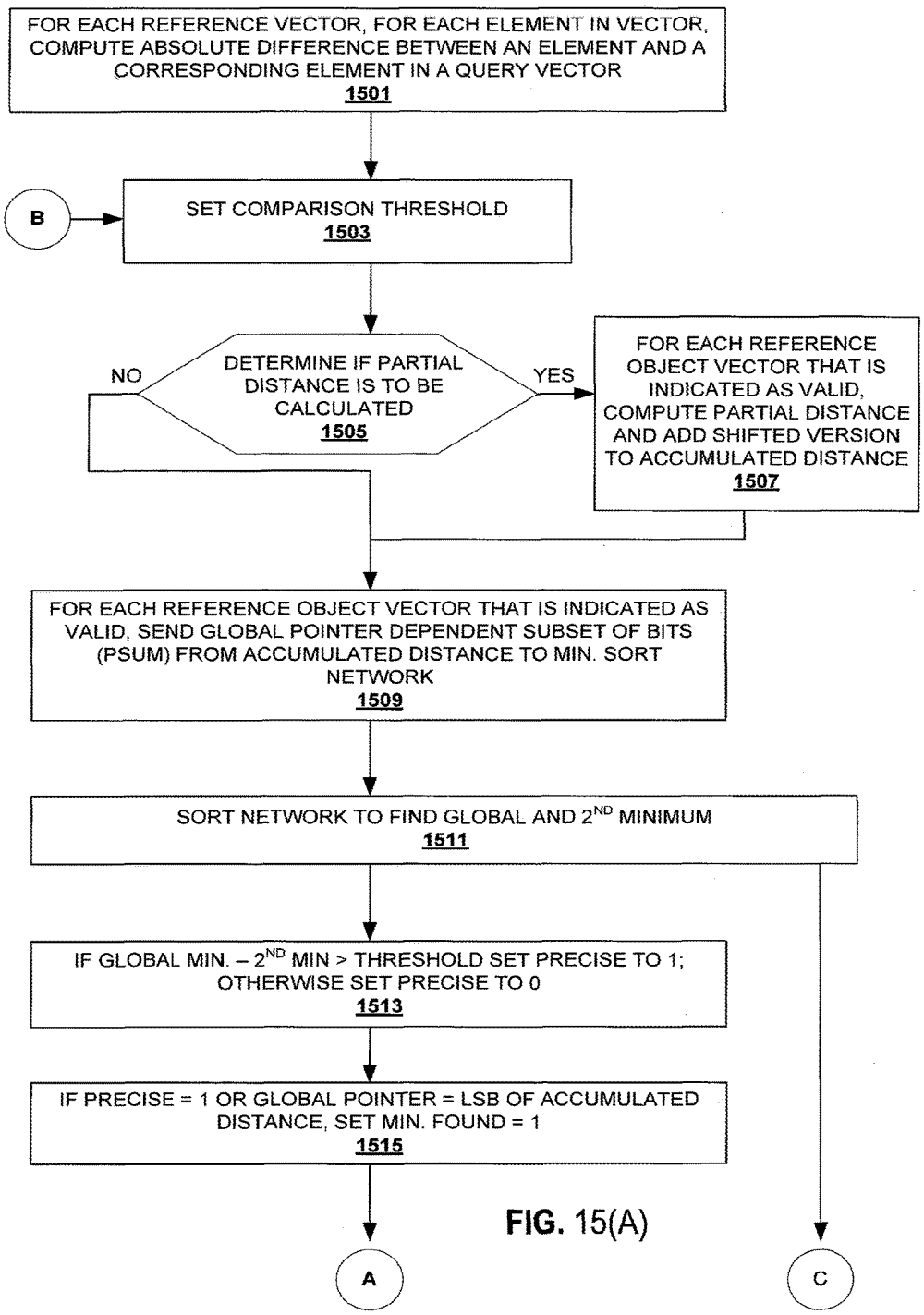
FIG. 15A-B illustrates an exemplary method of kNN searching according to an embodiment.
Figure 15B:
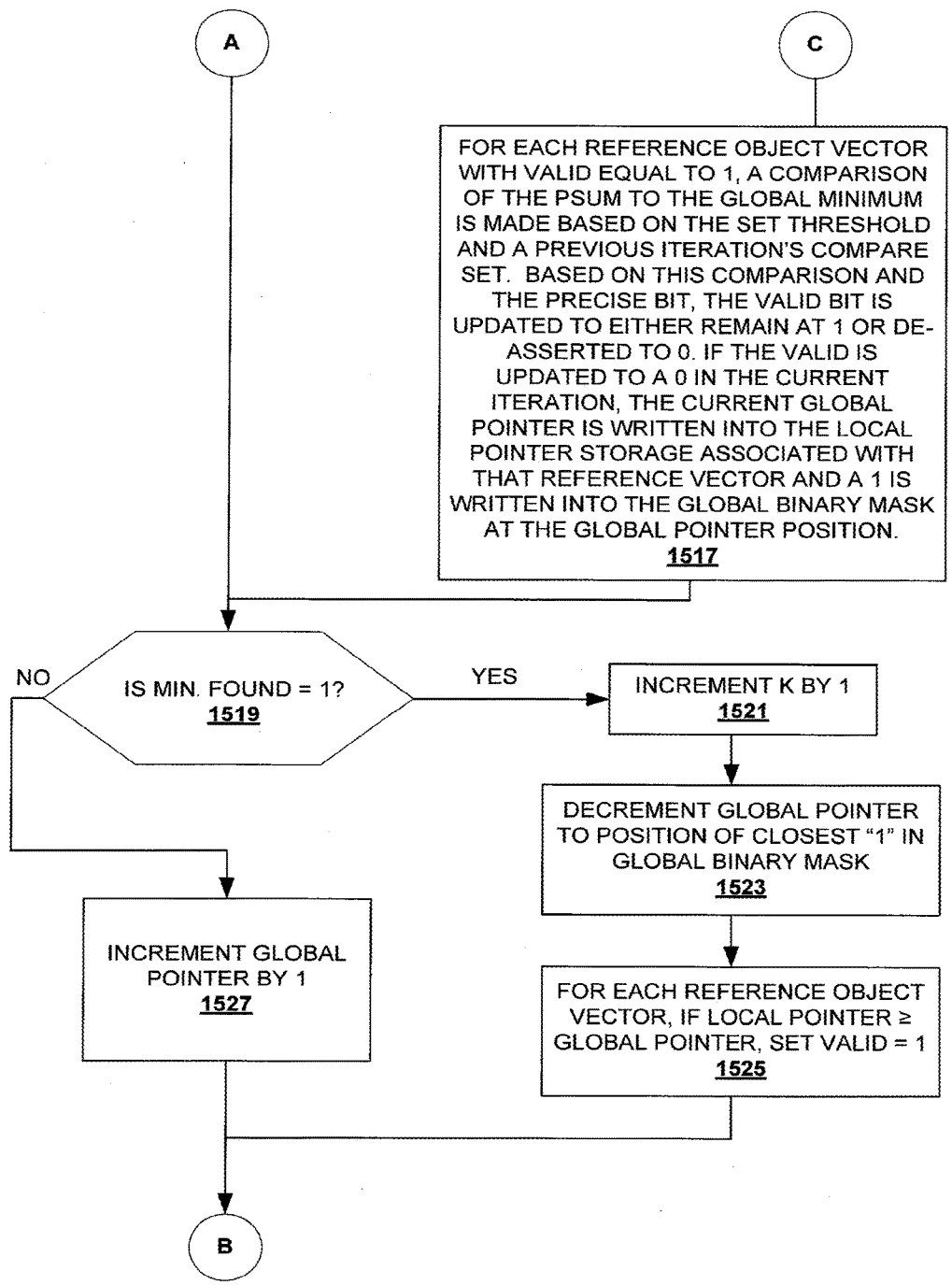

FIG. 15A-B illustrates an exemplary method of kNN searching according to an embodiment using embodiments of the kNN accelerator detailed above. At a high level, the method of kNN searching comprises calculating partial distances, accumulating those distances, and sorting those accumulated distances in an interleaved fashion. Below is a more detailed description of this process.

In some embodiments, one or more variables are reset. For example, an accumulated distances for each reference vector, a global pointer, a global binary mask, a k value, a validity bit for each reference vector (set to 1), and a local pointer for each reference vector.

At 1501, for each reference vector and each element of that reference vector, an absolute difference between that element and a corresponding element in the query vector is made.

At 1503, a comparison threshold based on the global pointer is set.

A determination of if a partial distance is to be calculated is made at 1505. When the partial distance should be calculated, for each reference object vector with a valid bit set to 1 (indicating valid), a partial distance is calculated (e.g., using the circuits in FIGS. 3 and 4 and compressor tree 211) and shifted and added to an accumulated distance at 1507.

When the partial distance should not be calculated or after 1507 has occurred, for each reference object vector with a valid bit set to 1 (indicating valid), a global pointer dependent subset of bits (psum) of the accumulated distance is sent to the minimum sort network at 1509.

The sort network finds a global minimum and second minimum at 1511.

A determination of if the global minimum minus the second minimum is greater than the set threshold is made at 1513. If yes, then precise is set to 1. At 1515, when the precise is 1, or the global pointer is the LSB of accumulated distance, then the minimum found is set to 1.

At 1517, typically in parallel with 1513, for each reference object vector with valid equal to 1, a comparison of the psum to the global minimum is made based on the set threshold and a previous iteration's compare set. Based on this comparison and the precise bit, the valid bit is updated to either remain at 1 or de-asserted to 0. If the valid is updated to a 0 in the current iteration, the current global pointer is written into the local pointer storage associated with that reference vector and a 1 is written into the global binary mask at the global pointer position.

At 1519, a determination of if the minimum found is equal to 1 is made. If yes, then k is incremented by 1 at 1521. If not, then the global pointer is incremented by 1 at 1521 and the comparison threshold.

After k is incremented, the global pointer is decremented to a position closest to 1 in the global binary mask at 1523. Essentially, a rollback of the global pointer to a last position where a reference object vector was eliminated form the search space is made.

At 1525, for each reference object vector, if the local pointer is greater than or equal to the global pointer, the valid bit is set to 1 and the comparison threshold is set again. This re-inserts a reference vector into the search space when the next nearest vectors is to be computed.

Though the above describes sorting and computation done for all reference vectors in parallel, these operations can be made more serial by performing the compute and sort operation for different vectors on the same circuit to save area.

The above described systems, methods, and apparatuses are usable to provide many advantages. The distance between vectors is computed iteratively such that in successive iterations the accuracy of the computed distance improves from MSB to LSB. In each iteration, the computation of a partial distance for a vector serves the purpose of improving the complete (accumulated) distance accuracy at a certain significance or bit position. The complete distance computation is broken up into a number of partial distance computations for different metrics such as Euclidian, Manhattan or Dot Product, such that after computing the upper bits, accuracy improvement in lower order bit positions over successive iterations never changes upper order bits beyond a certain threshold.

The above is accomplished using (i) partial distance compute circuits with circuits for 1D computation using control signals to compute the right partial distance and arrayed according to the dimensionality of the vector, (ii) the partial distances of all 1D computations summed using a compressor tree and (iii) an accumulator with storage for the current accumulated distance to which the partial distance is added at an appropriate significance using a shifter.

Sorting on these accumulated vector distances does not wait till the complete distance has been computed—the sorting can start with low accuracy distances. Sorting does not take all the bits of the accumulated distances into account—it is done iteratively with only a small window of bits starting from MSB to LSB. The sort network uses a programmable threshold (in the exemplary case it is 1 or 0) to declare if the minimum found in every comparison and in the entire sort network in an iteration is less than any other number by more than that threshold.

The computation and sorting are interleaved from MSB to LSB so that many reference vectors are eliminated from the search space with low accuracy distance computations, while only remaining vectors proceed to next iteration to improve lower bit accuracy for determining nearest neighbor.

Computations associated with each vector have local control that uses results of the sort network to determine if computation and sort for that vector proceeds to the next iteration or is removed from the search space.

Local control and distance accumulators in each vector computation maintain state even after it is eliminated from the search space. When finding the next nearest neighbor, the local control can reinsert the vector into the search space (based on global pointer) and reuse any prior computations up to the point of prior elimination.

Global control coordinates activity of which bits in the accumulated distances are sent to the sort network using a global pointer that is broadcast to all vectors.

Control signals for the iteration-dependent partial distance computation are also broadcast to all vectors from the global control. These control signals can be stored in a programmable look-up table referenced by the global pointer or as fixed function logic.

Global control keeps track of iterations at which vectors are eliminated from the search space when finding a nearest neighbor. The global control jumps back to the nearest iteration state at which vectors were eliminated to start the search with only those eliminated vectors in the search space to find the next nearest neighbor.

The kNN accelerator can be made programmable to change the order of sort.

Any number of bit sizes, dimensions, or number of vectors are supportable. Additionally, in some embodiments, the kNN accelerator is programmable so that the bit sizes per dimension, dimensionality or the number of reference vectors are programmed.

The operation can be serialized so that computation and sorting for different reference vectors are done using common partial distance compute and sort circuits.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures

In-Order and Out-of-Order Core Block Diagram

FIG. 16A is a block diagram illustrating both an exemplary in-order pipeline and an exemplary register renaming, out-of-order issue/execution pipeline according to embodiments of the invention. FIG. 16B is a block diagram illustrating both an exemplary embodiment of an in-order architecture core and an exemplary register renaming, out-of-order issue/execution architecture core to be included in a processor according to embodiments of the invention. The solid lined boxes in FIGS. 16A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 16A, a processor pipeline 1600 includes a fetch stage 1602, a length decode stage 1604, a decode stage 1606, an allocation stage 1608, a renaming stage 1610, a scheduling (also known as a dispatch or issue) stage 1612, a register read/memory read stage 1614, an execute stage 1616, a write back/memory write stage 1618, an exception handling stage 1622, and a commit stage 1624.

FIG. 16B shows processor core 1690 including a front end unit 1630 coupled to an execution engine unit 1650, and both are coupled to a memory unit 1670. The core 1690 may be a reduced instruction set computing (RISC) core, a complex instruction set computing (CISC) core, a very long instruction word (VLIW) core, or a hybrid or alternative core type. As yet another option, the core 1690 may be a special-purpose core, such as, for example, a network or communication core, compression engine, coprocessor core, general purpose computing graphics processing unit (GPGPU) core, graphics core, or the like.

The front end unit 1630 includes a branch prediction unit 1632 coupled to an instruction cache unit 1634, which is coupled to an instruction translation lookaside buffer (TLB) 1636, which is coupled to an instruction fetch unit 1638, which is coupled to a decode unit 1640. The decode unit 1640 (or decoder) may decode instructions, and generate as an output one or more micro-operations, micro-code entry points, microinstructions, other instructions, or other control signals, which are decoded from, or which otherwise reflect, or are derived from, the original instructions. The decode unit 1640 may be implemented using various different mechanisms. Examples of suitable mechanisms include, but are not limited to, look-up tables, hardware implementations, programmable logic arrays (PLAs), microcode read only memories (ROMs), etc. In one embodiment, the core 1690 includes a microcode ROM or other medium that stores microcode for certain macroinstructions (e.g., in decode unit 1640 or otherwise within the front end unit 1630). The decode unit 1640 is coupled to a rename/allocator unit 1652 in the execution engine unit 1650.

The execution engine unit 1650 includes the rename/allocator unit 1652 coupled to a retirement unit 1654 and a set of one or more scheduler unit(s) 1656. The scheduler unit(s) 1656 represents any number of different schedulers, including reservations stations, central instruction window, etc. The scheduler unit(s) 1656 is coupled to the physical register file(s) unit(s) 1658. Each of the physical register file(s) units 1658 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 1658 comprises a vector registers unit, a write mask registers unit, and a scalar registers unit. These register units may provide architectural vector registers, vector mask registers, and general purpose registers. The physical register file(s) unit(s) 1658 is overlapped by the retirement unit 1654 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 1654 and the physical register file(s) unit(s) 1658 are coupled to the execution cluster(s) 1660. The execution cluster(s) 1660 includes a set of one or more execution units 1662 and a set of one or more memory access units 1664. The execution units 1662 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 1656, physical register file(s) unit(s) 1658, and execution cluster(s) 1660 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 1664). It should also be understood that where separate pipelines are used, one or more of these pipelines may be out-of-order issue/execution and the rest in-order.

The set of memory access units 1664 is coupled to the memory unit 1670, which includes a data TLB unit 1672 coupled to a data cache unit 1674 coupled to a level 2 (L2) cache unit 1676. In one exemplary embodiment, the memory access units 1664 may include a load unit, a store address unit, and a store data unit, each of which is coupled to the data TLB unit 1672 in the memory unit 1670. The instruction cache unit 1634 is further coupled to a level 2 (L2) cache unit 1676 in the memory unit 1670. The L2 cache unit 1676 is coupled to one or more other levels of cache and eventually to a main memory.

By way of example, the exemplary register renaming, out-of-order issue/execution core architecture may implement the pipeline 1600 as follows: 1) the instruction fetch 1638 performs the fetch and length decoding stages 1602 and 1604; 2) the decode unit 1640 performs the decode stage 1606; 3) the rename/allocator unit 1652 performs the allocation stage 1608 and renaming stage 1610; 4) the scheduler unit(s) 1656 performs the schedule stage 1612; 5) the physical register file(s) unit(s) 1658 and the memory unit 1670 perform the register read/memory read stage 1614; the execution cluster 1660 perform the execute stage 1616; 6) the memory unit 1670 and the physical register file(s) unit(s) 1658 perform the write back/memory write stage 1618; 7) various units may be involved in the exception handling stage 1622; and 8) the retirement unit 1654 and the physical register file(s) unit(s) 1658 perform the commit stage 1624.

The core 1690 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 1690 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 1634/1674 and a shared L2 cache unit 1676, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary in-Order Core Architecture

FIGS. 17A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 17A is a block diagram of a single processor core, along with its connection to the on-die interconnect network 1702 and with its local subset of the Level 2 (L2) cache 1704, according to embodiments of the invention. In one embodiment, an instruction decoder 1700 supports the x86 instruction set with a packed data instruction set extension. An L1 cache 1706 allows low-latency accesses to cache memory into the scalar and vector units. While in one embodiment (to simplify the design), a scalar unit 1708 and a vector unit 1710 use separate register sets (respectively, scalar registers 1712 and vector registers 1714) and data transferred between them is written to memory and then read back in from a level 1 (L1) cache 1706, alternative embodiments of the invention may use a different approach (e.g., use a single register set or include a communication path that allow data to be transferred between the two register files without being written and read back).

The local subset of the L2 cache 1704 is part of a global L2 cache that is divided into separate local subsets, one per processor core. Each processor core has a direct access path to its own local subset of the L2 cache 1704. Data read by a processor core is stored in its L2 cache subset 1704 and can be accessed quickly, in parallel with other processor cores accessing their own local L2 cache subsets. Data written by a processor core is stored in its own L2 cache subset 1704 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 17B is an expanded view of part of the processor core in FIG. 17A according to embodiments of the invention. FIG. 17B includes an L1 data cache 1706A part of the L1 cache 1704, as well as more detail regarding the vector unit 1710 and the vector registers 1714. Specifically, the vector unit 1710 is a 16-wide vector processing unit (VPU) (see the 16-wide ALU 1728), which executes one or more of integer, single-precision float, and double-precision float instructions. The VPU supports swizzling the register inputs with swizzle unit 1720, numeric conversion with numeric convert units 1722A-B, and replication with replication unit 1724 on the memory input. Write mask registers 1726 allow predicating resulting vector writes.

Processor with Integrated Memory Controller and Graphics

Figure 18:
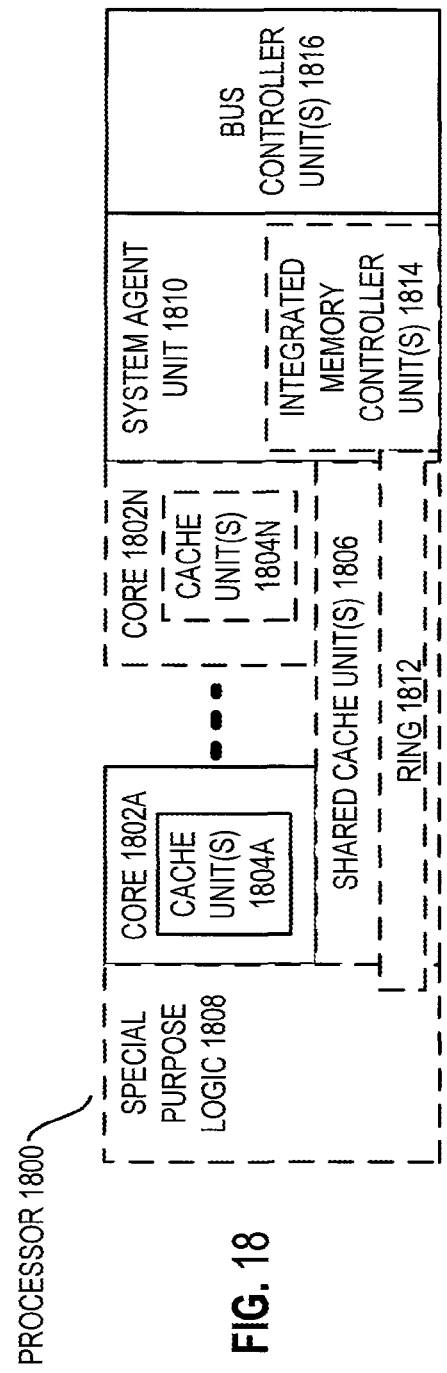
FIG. 18 is a block diagram of a processor 1800 that may have more than one core, may have an integrated memory controller, and may have integrated graphics according to embodiments of the invention.

FIG. 18 is a block diagram of a processor 1800 that may have more than one core, may have an integrated memory controller, and may have integrated graphics according to embodiments of the invention. The solid lined boxes in FIG. 18 illustrate a processor 1800 with a single core 1802A, a system agent 1810, a set of one or more bus controller units 1816, while the optional addition of the dashed lined boxes illustrates an alternative processor 1800 with multiple cores 1802A-N, a set of one or more integrated memory controller unit(s) 1814 in the system agent unit 1810, and special purpose logic 1808.

Thus, different implementations of the processor 1800 may include: 1) a CPU with the special purpose logic 1808 being integrated graphics and/or scientific (throughput) logic (which may include one or more cores), and the cores 1802A-N being one or more general purpose cores (e.g., general purpose in-order cores, general purpose out-of-order cores, a combination of the two); 2) a coprocessor with the cores 1802A-N being a large number of special purpose cores intended primarily for graphics and/or scientific (throughput); and 3) a coprocessor with the cores 1802A-N being a large number of general purpose in-order cores. Thus, the processor 1800 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1800 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 1806, and external memory (not shown) coupled to the set of integrated memory controller units 1814. The set of shared cache units 1806 may include one or more mid-level caches, such as level 2 (L2), level 3 (L3), level 4 (L4), or other levels of cache, a last level cache (LLC), and/or combinations thereof. While in one embodiment a ring based interconnect unit 1812 interconnects the integrated graphics logic 1808, the set of shared cache units 1806, and the system agent unit 1810/integrated memory controller unit(s) 1814, alternative embodiments may use any number of well-known techniques for interconnecting such units. In one embodiment, coherency is maintained between one or more cache units 1806 and cores 1802-A-N.

In some embodiments, one or more of the cores 1802A-N are capable of multi-threading. The system agent 1810 includes those components coordinating and operating cores 1802A-N. The system agent unit 1810 may include for example a power control unit (PCU) and a display unit. The PCU may be or include logic and components needed for regulating the power state of the cores 1802A-N and the integrated graphics logic 1808. The display unit is for driving one or more externally connected displays.

The cores 1802A-N may be homogenous or heterogeneous in terms of architecture instruction set; that is, two or more of the cores 1802A-N may be capable of execution the same instruction set, while others may be capable of executing only a subset of that instruction set or a different instruction set.

Exemplary Computer Architectures

FIGS. 19-22 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 19:
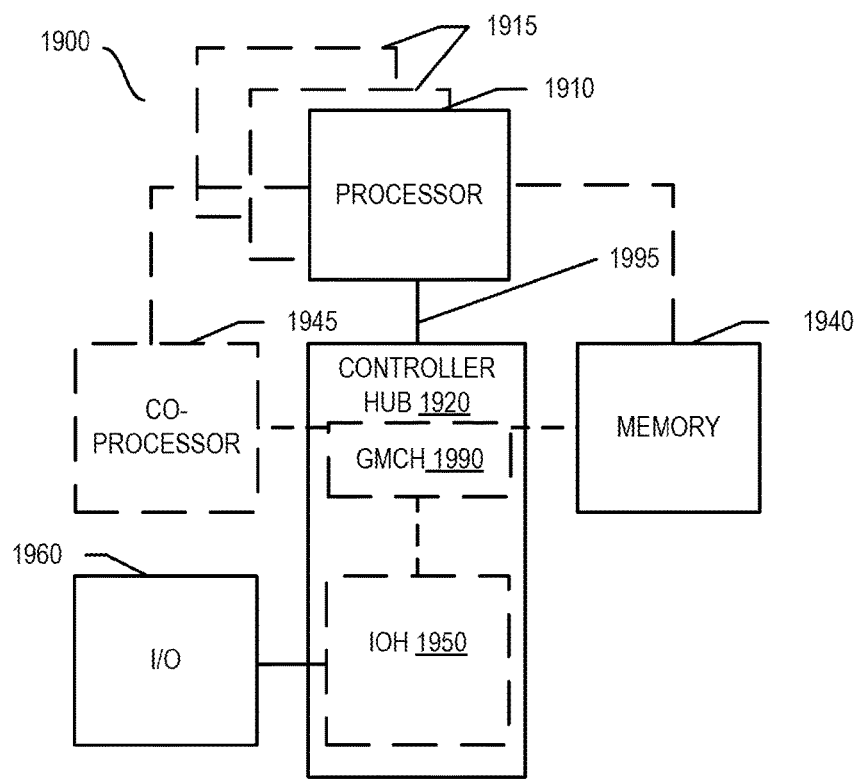
FIGS. 19-22 are block diagrams of exemplary computer architectures.

Referring now to FIG. 19, shown is a block diagram of a system 1900 in accordance with one embodiment of the present invention. The system 1900 may include one or more processors 1910, 1915, which are coupled to a controller hub 1920. In one embodiment the controller hub 1920 includes a graphics memory controller hub (GMCH) 1990 and an Input/Output Hub (IOH) 1950 (which may be on separate chips); the GMCH 1990 includes memory and graphics controllers to which are coupled memory 1940 and a coprocessor 1945; the IOH 1950 is couples input/output (I/O) devices 1960 to the GMCH 1990. Alternatively, one or both of the memory and graphics controllers are integrated within the processor (as described herein), the memory 1940 and the coprocessor 1945 are coupled directly to the processor 1910, and the controller hub 1920 in a single chip with the IOH 1950.

The optional nature of additional processors 1915 is denoted in FIG. 19 with broken lines. Each processor 1910, 1915 may include one or more of the processing cores described herein and may be some version of the processor 1800.

The memory 1940 may be, for example, dynamic random access memory (DRAM), phase change memory (PCM), or a combination of the two. For at least one embodiment, the controller hub 1920 communicates with the processor(s) 1910, 1915 via a multi-drop bus, such as a frontside bus (FSB), point-to-point interface such as QuickPath Interconnect (QPI), or similar connection 1995.

In one embodiment, the coprocessor 1945 is a special-purpose processor, such as, for example, a high-throughput MIC processor, a network or communication processor, compression engine, graphics processor, GPGPU, embedded processor, or the like. In one embodiment, controller hub 1920 may include an integrated graphics accelerator.

There can be a variety of differences between the physical resources 1910, 1915 in terms of a spectrum of metrics of merit including architectural, microarchitectural, thermal, power consumption characteristics, and the like.

In one embodiment, the processor 1910 executes instructions that control data processing operations of a general type. Embedded within the instructions may be coprocessor instructions. The processor 1910 recognizes these coprocessor instructions as being of a type that should be executed by the attached coprocessor 1945. Accordingly, the processor 1910 issues these coprocessor instructions (or control signals representing coprocessor instructions) on a coprocessor bus or other interconnect, to coprocessor 1945. Coprocessor(s) 1945 accept and execute the received coprocessor instructions.

Figure 20:
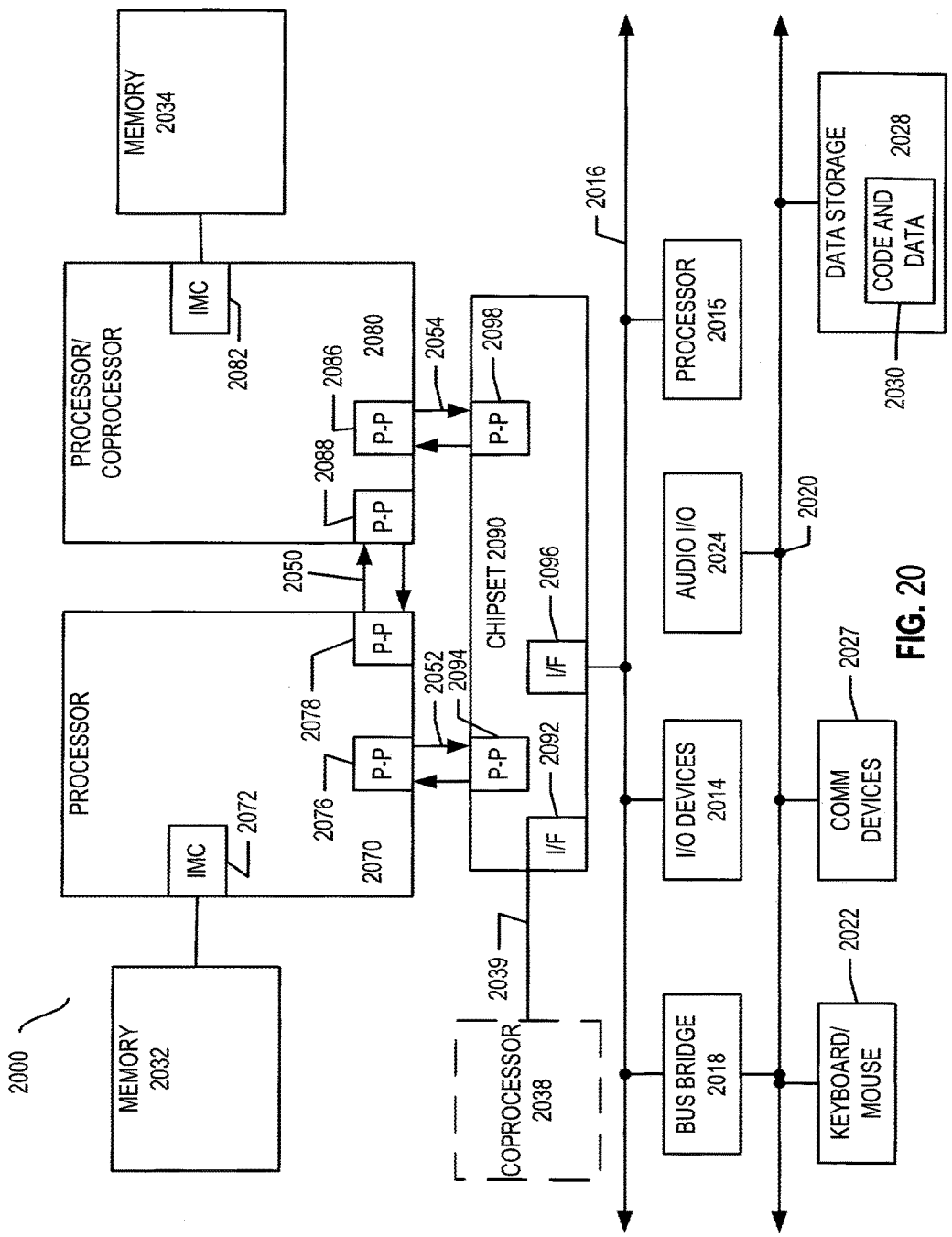

Referring now to FIG. 20, shown is a block diagram of a first more specific exemplary system 2000 in accordance with an embodiment of the present invention. As shown in FIG. 20, multiprocessor system 2000 is a point-to-point interconnect system, and includes a first processor 2070 and a second processor 2080 coupled via a point-to-point interconnect 2050. Each of processors 2070 and 2080 may be some version of the processor 1800. In one embodiment of the invention, processors 2070 and 2080 are respectively processors 1910 and 1915, while coprocessor 2038 is coprocessor 1945. In another embodiment, processors 2070 and 2080 are respectively processor 1910 coprocessor 1945.

Processors 2070 and 2080 are shown including integrated memory controller (IMC) units 2072 and 2082, respectively. Processor 2070 also includes as part of its bus controller units point-to-point (P-P) interfaces 2076 and 2078; similarly, second processor 2080 includes P-P interfaces 2086 and 2088. Processors 2070, 2080 may exchange information via a point-to-point (P-P) interface 2050 using P-P interface circuits 2078, 2088. As shown in FIG. 20, IMCs 2072 and 2082 couple the processors to respective memories, namely a memory 2032 and a memory 2034, which may be portions of main memory locally attached to the respective processors.

Processors 2070, 2080 may each exchange information with a chipset 2090 via individual P-P interfaces 2052, 2054 using point to point interface circuits 2076, 2094, 2086, 2098. Chipset 2090 may optionally exchange information with the coprocessor 2038 via a high-performance interface 2039. In one embodiment, the coprocessor 2038 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 2090 may be coupled to a first bus 2016 via an interface 2096. In one embodiment, first bus 2016 may be a Peripheral Component Interconnect (PCI) bus, or a bus such as a PCI Express bus or another third generation I/O interconnect bus, although the scope of the present invention is not so limited.

As shown in FIG. 20, various I/O devices 2014 may be coupled to first bus 2016, along with a bus bridge 2018 which couples first bus 2016 to a second bus 2020. In one embodiment, one or more additional processor(s) 2015, such as coprocessors, high-throughput MIC processors, GPGPU's, accelerators (such as, e.g., graphics accelerators or digital signal processing (DSP) units), field programmable gate arrays, or any other processor, are coupled to first bus 2016. In one embodiment, second bus 2020 may be a low pin count (LPC) bus. Various devices may be coupled to a second bus 2020 including, for example, a keyboard and/or mouse 2022, communication devices 2027 and a storage unit 2028 such as a disk drive or other mass storage device which may include instructions/code and data 2030, in one embodiment. Further, an audio I/O 2024 may be coupled to the second bus 2020. Note that other architectures are possible. For example, instead of the point-to-point architecture of FIG. 20, a system may implement a multi-drop bus or other such architecture.

Figure 21:
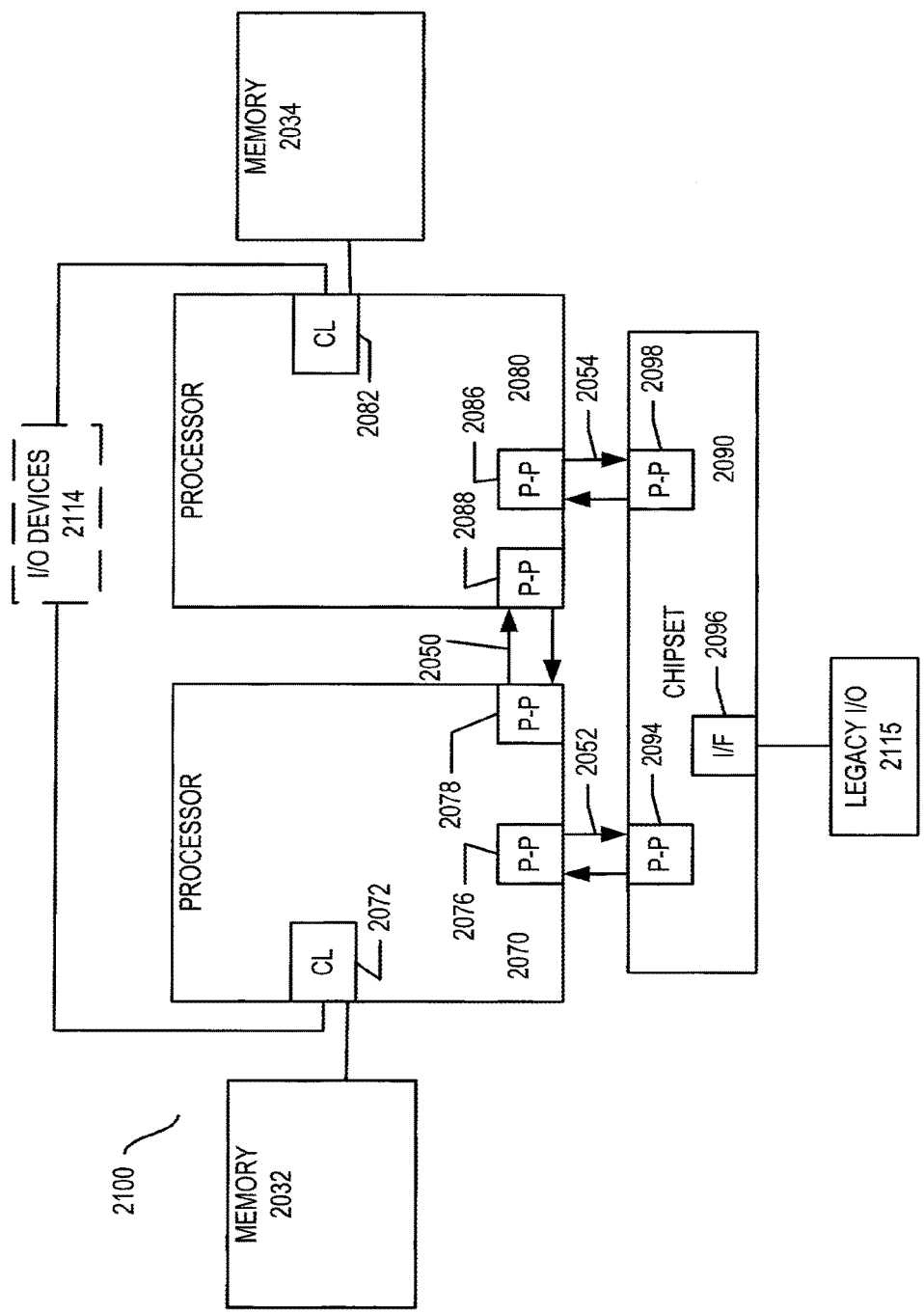

Referring now to FIG. 21, shown is a block diagram of a second more specific exemplary system 2100 in accordance with an embodiment of the present invention. Like elements in FIGS. 20 and 21 bear like reference numerals, and certain aspects of FIG. 20 have been omitted from FIG. 21 in order to avoid obscuring other aspects of FIG. 21.

FIG. 21 illustrates that the processors 2070, 2080 may include integrated memory and I/O control logic ("CL") 2072 and 2082, respectively. Thus, the CL 2072, 2082 include integrated memory controller units and include I/O control logic. FIG. 21 illustrates that not only are the memories 2032, 2034 coupled to the CL 2072, 2082, but also that I/O devices 2114 are also coupled to the control logic 2072, 2082. Legacy I/O devices 2115 are coupled to the chipset 2090.

Figure 22:
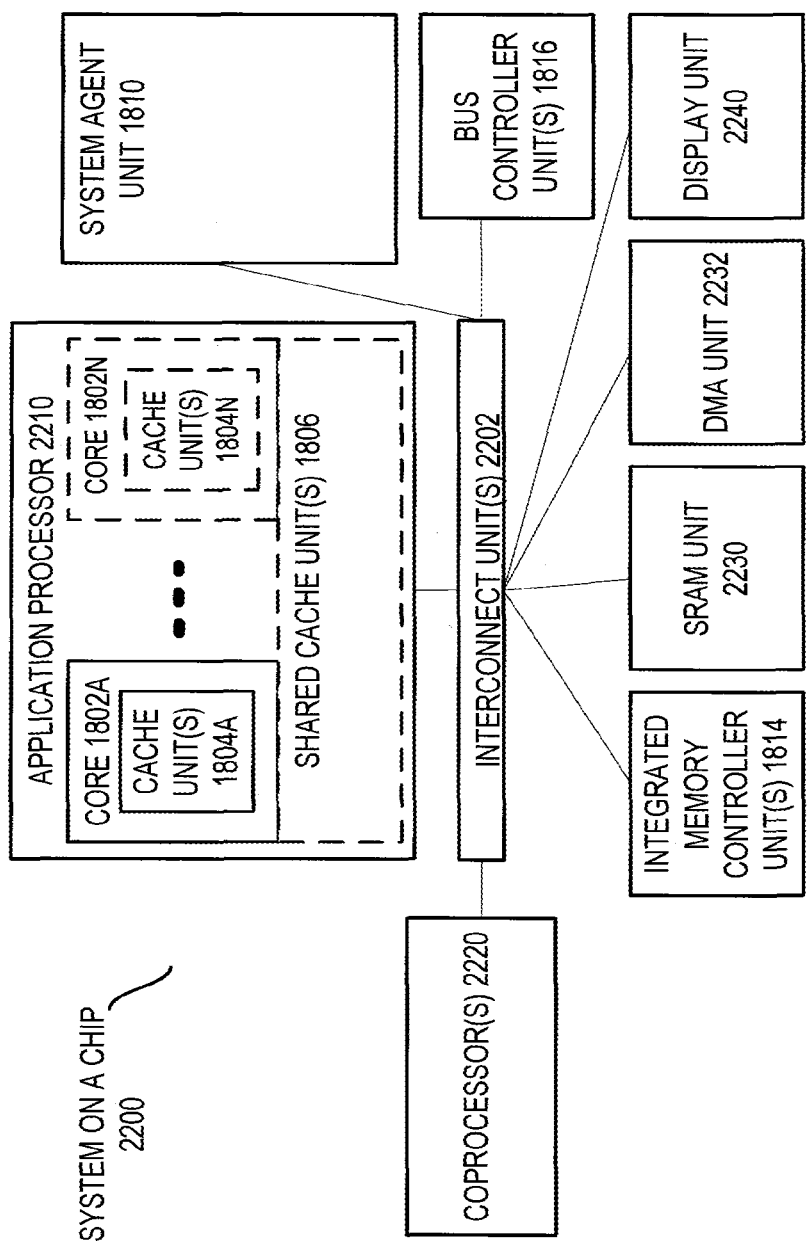

Referring now to FIG. 22, shown is a block diagram of a SoC 2200 in accordance with an embodiment of the present invention. Similar elements in FIG. 18 bear like reference numerals. Also, dashed lined boxes are optional features on more advanced SoCs. In FIG. 22, an interconnect unit(s) 2202 is coupled to: an application processor 2210 which includes a set of one or more cores 202A-N and shared cache unit(s) 1806; a system agent unit 1810; a bus controller unit(s) 1816; an integrated memory controller unit(s) 1814; a set or one or more coprocessors 2220 which may include integrated graphics logic, an image processor, an audio processor, and a video processor; an static random access memory (SRAM) unit 2230; a direct memory access (DMA) unit 2232; and a display unit 2240 for coupling to one or more external displays. In one embodiment, the coprocessor(s) 2220 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 2030 illustrated in FIG. 20, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 23:
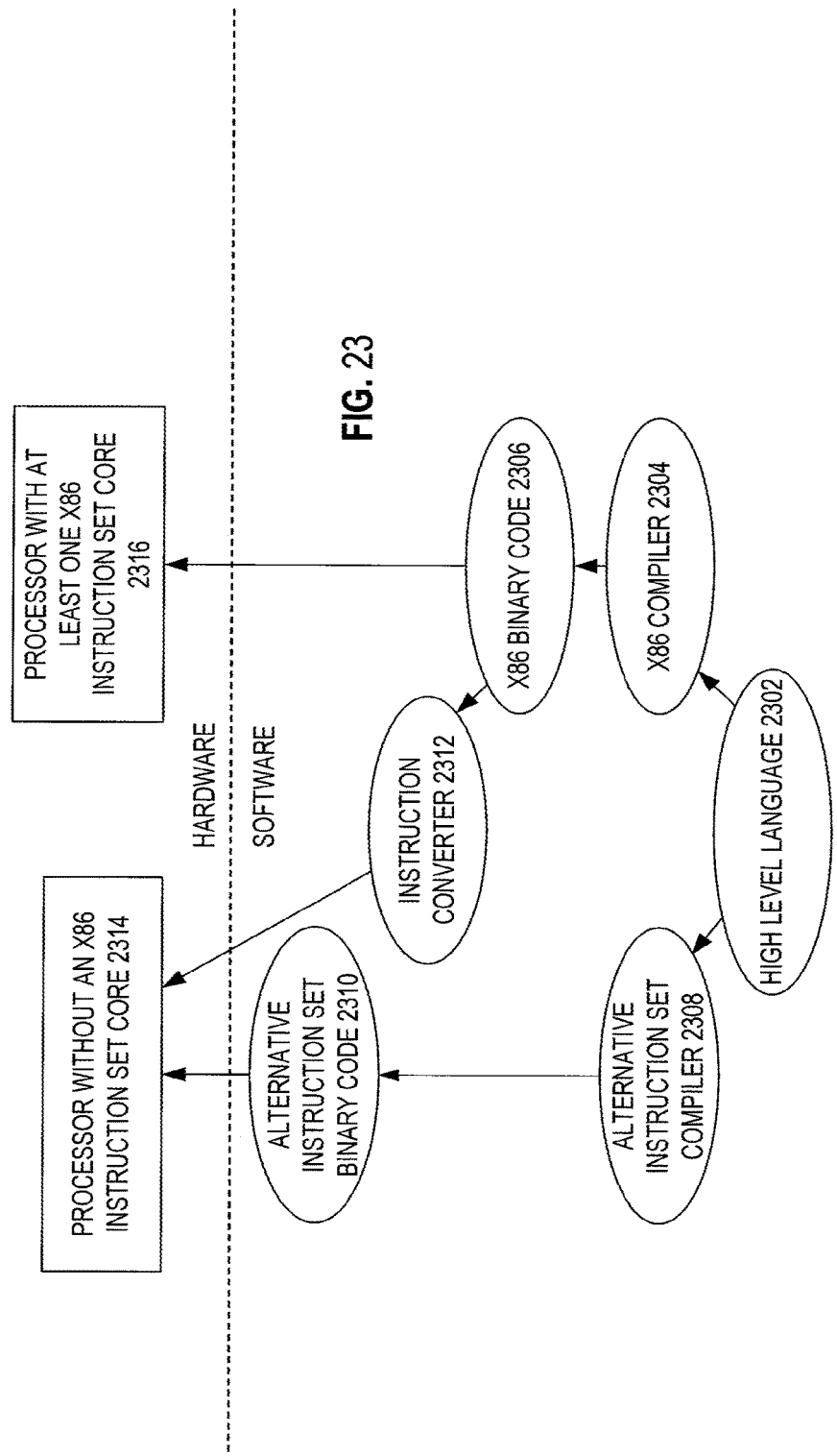
FIG. 23 is a block diagram contrasting the use of a software instruction converter to convert binary instructions in a source instruction set to binary instructions in a target instruction set according to embodiments of the invention.

FIG. 23 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 23 shows a program in a high level language 2302 may be compiled using an x86 compiler 2304 to generate x86 binary code 2306 that may be natively executed by a processor with at least one x86 instruction set core 2316. The processor with at least one x86 instruction set core 2316 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 2304 represents a compiler that is operable to generate x86 binary code 2306 (e.g., object code) that can, with or without additional linkage processing, be executed on the processor with at least one x86 instruction set core 2316. Similarly, FIG. 23 shows the program in the high level language 2302 may be compiled using an alternative instruction set compiler 2308 to generate alternative instruction set binary code 2310 that may be natively executed by a processor without at least one x86 instruction set core 2314 (e.g., a processor with cores that execute the MIPS instruction set of MIPS Technologies of Sunnyvale, Calif. and/or that execute the ARM instruction set of ARM Holdings of Sunnyvale, Calif.). The instruction converter 2312 is used to convert the x86 binary code 2306 into code that may be natively executed by the processor without an x86 instruction set core 2314. This converted code is not likely to be the same as the alternative instruction set binary code 2310 because an instruction converter capable of this is difficult to make; however, the converted code will accomplish the general operation and be made up of instructions from the alternative instruction set. Thus, the instruction converter 2312 represents software, firmware, hardware, or a combination thereof that, through emulation, simulation or any other process, allows a processor or other electronic device that does not have an x86 instruction set processor or core to execute the x86 binary code 2306.

We claim:
1. An apparatus comprising:
a plurality of vector partial distance computation circuits each to calculate a partial sum and an accumulated distance for a set of vectors in a search space;
a minimum sort network to sort a selected set of bits from the accumulated distances that indicate a minimum of the selected sets of bits from the vectors in the search space and whether the minimum is unique;
a global control circuit to receive an output of the minimum sort network and to control aspects of operations of the plurality of vector partial distance computation circuits.
2. The apparatus of claim 1, wherein each vector partial distance computation circuit comprises:
a plurality of data element calculator circuits;
a compressor tree circuit to add each result of the plurality of data element calculator circuits; and
an local control circuit to output a smaller window of bits from the accumulated distance.
3. The apparatus of claim 1, wherein the minimum sort network comprises:
a plurality of 0 level comparison nodes to receive a partial sum and valid bit from neighboring vector partial distance computation circuits and to output a valid bit, precise bit, address, and sum, wherein the 0 level comparison nodes to
logically OR the received neighboring valid bits to provide the output valid bit,
exclusive OR the received neighboring valid bits to provide the output precise bit with an output of a sum of possible differences of the neighboring sums comparison to generate the output precise bit, wherein the precise bit to indicate whether a difference between the two inputs is greater than a programmable threshold; and
a plurality of k level comparison nodes to receive a partial sum, valid bit, address, and precise bit from neighboring comparison nodes and to output a valid bit, precise bit, address, and sum, a result of a comparison of the received sums to select from incoming precise signals and a logically AND of the selected precise with the precise signal computed at this node to produce the output precise signal that indicates if the output sum is unique.
4. The apparatus of claim 3, wherein the global control circuit comprises:

an OR tree to receive and OR a plurality of eliminate bits from a plurality of local control circuits;

a global mask to indicate to the global control logic where a global pointer needs to jump back to for the group of vectors that would contain the next nearest neighbor;

a selector to select the global pointer from a previous global pointer incremented by one and an output from a priority encoder coupled to the global mask.

5. The apparatus of claim 1, wherein a bit size per dimension, dimensionality, and number of references are programmable.

6. The apparatus of claim 2, wherein each of the plurality of data element calculator circuits is a sum of absolute difference circuit.

7. The apparatus of claim 2, wherein each of the plurality of data element calculator circuits is a sum of squares circuit.

8. The apparatus of claim 2, wherein each of the plurality of data element calculator circuits is a 8-bit to 16-bit reconfigurable circuit.

9. The apparatus of claim 2, wherein each of the plurality of data element calculator circuits is a dot product circuit.

10. The apparatus of claim 1, wherein the global control circuit to coordinate activity of which bits in the accumulated distances are sent to the sort network using a global pointer that is broadcast to all vectors, broadcast control signals for the iteration-dependent partial distance computation to all vectors, and track of iterations at which vectors are eliminated from the search space when finding a nearest neighbor.

11. The apparatus of claim 10, wherein the control signals to be stored in a programmable look-up table referenced by the global pointer.

12. The apparatus of claim 2, wherein the local control circuits and distance accumulators in each vector partial distance computation circuit to maintain state even after it is eliminated from the search space, and when finding the next nearest neighbor, the local control capable of reinserting the vector into the search space and reuse any prior computations up to the point of prior elimination.

13. A method comprising:
performing successive iterations of,
calculating partial distances for a plurality of vectors with respect to a query vector by
using control signals to compute the right partial distance and arrayed according to the dimensionality of the vector using 1D computation circuits,
summing the partial distances of all 1D computations using a hardware compressor tree, and
adding the summed partial distances to a current accumulated distance;
accumulating the calculated distances;
sorting those accumulated distances starting from a most significant bit to a least significant bit.

14. The method of claim 13, wherein each successive iteration improves an accuracy of the calculated partial distance from a most significant bit to a least significant bit.

15. The method of claim 13, wherein sorting those accumulated distances starting from a most significant bit to a least significant bit begins with low accuracy distances and only remaining vectors proceed to next iteration to improve lower bit accuracy for determining nearest neighbor.

16. The method of claim 13, wherein a sort network to perform the sorting using a programmable threshold to declare if a minimum found in every comparison.

17. The method of claim 13, wherein the accumulated distance computation is broken up into a number of partial distance computations for different metrics such that after computing the upper bits, accuracy improvement in lower order bit positions over successive iterations never changes upper order bits beyond a certain threshold.

* * * * *